United States Patent [19]

Yoshida et al.

[11] Patent Number: 5,675,357
[45] Date of Patent: Oct. 7, 1997

[54] IMAGE DISPLAY/INPUT APPARATUS

[75] Inventors: Yasuhiro Yoshida; Kengo Takahama, both of Nara; Yoshihiko Takeda, Tenri; Yoshihiro Yamamoto, Nara, all of Japan

[73] Assignee: Sharp Kabushiki Kaisha, Osaka, Japan

[21] Appl. No.: 467,218

[22] Filed: Jun. 6, 1995

[30]  Foreign Application Priority Data

Oct. 11, 1994  [JP]  Japan .................... 6-245277
Nov. 28, 1994  [JP]  Japan .................... 6-292809

[51] Int. Cl.⁶ ................... G09G 3/36; G09G 5/00
[52] U.S. Cl. ........................... 345/104; 345/156
[58] Field of Search ........................ 345/104, 173,
345/156; 359/60, 72, 58, 59; 349/12, 56,
57, 116, 110, 106; 178/19, 18; G09G 3/36,
5/00

[56]  References Cited

U.S. PATENT DOCUMENTS 4,777,534  10/1988  Yaniv et al. .................. 358/294
5,327,503   7/1994  Kiyohara ...................... 345/104
5,446,564   8/1995  Mawatari et al. .............. 359/72

FOREIGN PATENT DOCUMENTS 0 299 257    6/1988  European Pat. Off. .
0 410 395 A2 7/1990  European Pat. Off. .
0 571 214 A1 5/1993  European Pat. Off. .
58-66142     4/1983  Japan .
61-101827    5/1986  Japan .
61-314791   12/1986  Japan .
5-89230      4/1993  Japan .
5-313164    11/1993  Japan .

*Primary Examiner*—Michael H. Lee
*Attorney, Agent, or Firm*—David G. Conlin; Brian L. Michaelis

[57]  ABSTRACT

A backlight emits diffused light beams. An emission direction characteristic-forming plate allows light beams which have been incident thereon at generally right angles therewith to pass therethrough and intercepts light beams which have been incident thereon obliquely. An image display/input panel has light receiving elements each incorporated in a corresponding pixel having a liquid crystal cell. In an image input operation, pixels are sequentially turned on and off so as to scan an original document by parallel light emitted vertically from a turned-on pixel. Light reflected by the original document is received by the light receiving element incorporated in the turned-on pixel and converted into an electric signal. Light emitted from the turned-on pixel of the image display/input panel and reflected by the original document is received by only the turned-on pixel. In this manner, a high resolution can be obtained in the image input operation.

11 Claims, 26 Drawing Sheets

IMAGE DISPLAY/INPUT APPARATUS

BACKGROUND OF THE INVENTION

1. Field of the Invention

The present invention relates to an image display/input apparatus having both an image display function and an image input function.

2. Description of the Prior Art

Some proposals of image display/input panels having both an image display function and an image input function were made in, for example, Japanese Patent Publication No. 5-40927 "Image input/output apparatus", Japanese Laid-Open Patent Publication No. 63-163886 "Display/input liquid crystal panel", Japanese Laid-Open Patent Publication No. 5-89230 "Image reading/display apparatus", and Japanese Patent Publication No. 60-1646 "Display/input apparatus".

In Japanese Patent Publication No. 5-40927 "Image input/output apparatus", an image input/output panel is formed of a plurality of pairs of light emitting elements and light receiving elements arranged in a matrix configuration on a plane. In operating the image input/output panel as an image display apparatus, the light emitting elements are driven based on image data, whereas in operating the image input/output panel as an image input apparatus, a sheet of paper on which density information such as characters has been written is overlaid on the image input/output panel with an information-written plane opposed thereto. The light emitting elements are then turned on to irradiate the paper, and light reflected by the paper is received by the light receiving elements making a pair with the respective light emitting elements.

In Japanese Laid-Open Patent Publication No. 63-163886 "Display/input liquid crystal panel", light receiving elements are formed in pixels of the liquid crystal panel. In operating the liquid crystal panel as an image input apparatus, a sheet of paper is irradiated from outside, and light reflected by the paper or light which has transmitted it is allowed to be incident on the liquid crystal panel, and electric signals obtained from the light receiving elements provided in the liquid crystal panel are detected.

In Japanese Laid-Open Patent Publication No. 5-89230 "Image reading/display apparatus", light receiving elements are incorporated in a simple matrix liquid crystal panel. As in the case of Japanese Laid-Open Patent Publication No. 63-163886 "Display/input liquid crystal panel", image information is inputted to the apparatus.

In Japanese Patent Publication No. 60-1646 "Display/input apparatus", a display driving section and a light receptor driving section are provided in one pixel of a panel. In inputting image information to the apparatus, light entering the panel is interrupted with fingers or another object so that a light receiving transistor of the light receptor driving section is turned off and an input coordinate is detected.

When the image display/input panels described above are operated as image input apparatuses, the display element is used as the light emitting element. Light emitted by the display element (light emitting element) and reflected by an original document is received by the light receiving element making a pair with the display element.

The fundamental operation of the prior art is described below by taking the Image input/output apparatus disclosed in Japanese Patent Publication No. 5-40927 as an example.

FIG. 33 is a perspective view showing the prior art image display/input panel. FIG. 34 is an enlarged partial perspective view showing the construction of the image input/output panel. FIGS. 35A and 35B are explanatory views showing the operation of the image input/output panel at the time when it functions as an image display apparatus and as an image input apparatus, respectively.

As shown in FIG. 33, the image input/output panel is formed of pixels 2 arranged on a rectangular substrate 1 in a matrix configuration of (n×m).

As shown in FIG. 34, each pixel 2 is composed of a display element 2a and an input element 2b which make a pair. Herein, as the display element 2a, a light emitting element such as a light emitting diode is used, while as the input element 2b, a light receiving element such as a phototransistor is used. The display element 2a and the input element 2b are arranged adjacently to each other in a state that a light emitting surface of the display element 2a and a light receiving surface of the input element 2b are directed upward.

When the image input/output panel constructed as described above is operated as the image display apparatus, as shown in FIG. 35A, only the display element 2a of each pixel 2 is used. Similar to a display apparatus having a dot matrix construction, the panel turns on or off the display element 2a of each pixel 2 corresponding to a dot, based on image data. In this manner, two-dimensional patterns and/or characters are displayed.

When the image input/output panel is operated as an image input apparatus, as shown in FIG. 35B, an original document 3 bearing patterns and/or characters on one side is placed on the image input/output panel with the ink-adhered side of the original document 3 opposed to the pixels 2, and the display elements 2a of the respective pixels 2 are sequentially driven to emit light. Intensity of light reflected by the original document 3 are detected by means of the input elements 2b.

Weak light beams reflected by the ink-adhered surface portions of the original document 3 of a low reflectivity and strong light beams reflected by the non-inked surface portions of the original document 3 of a high reflectivity enters on the input elements 2b. As a result, electric signals read by the input elements 2b are binarized to obtain image data indicating a density pattern on the original document 3.

The description of the conventional image display/input panel has been made by taking the Japanese Patent Publication No. 5-40927 "Image input/output apparatus" as an example. In Japanese Laid-Open Patent Publication No. 63-163886 "Display/input liquid crystal panel" and Japanese Laid-Open Patent Publication No. 5-89230 "Image reading/display apparatus", the light receiving element is incorporated in the pixel of the liquid crystal panel so as to perform operations as in Japanese Patent Publication No. 5-40927 "Image input/output apparatus".

As an example in which the light receiving element is incorporated in the pixel of the liquid crystal panel, the construction of the liquid crystal panel of "Display/input liquid crystal panel" disclosed in Japanese Laid-Open Patent Publication No. 63-163886 is shown in FIG. 36.

A gate line 6, a source line 7, and a signal line 8 are arranged in a lattice configuration on the inner surface of a substrate on which a pixel electrode 5 of a liquid crystal cell has been formed. A thin film transistor A constituting a switching element is formed in the vicinity of the intersection of the gate line 6 and the source line 7. The source line 7 is connected with a source electrode of the thin film transistor A; the gate line 6 is connected with a gate electrode thereof; and a drain electrode 9 of the thin film transistor A is connected with the pixel electrode 5.

A thin film optical sensor B constituting the light receiving element is formed in the vicinity of the intersection of the gate line 6 and the signal line 8. The gate line 6 is connected with one end of the thin film optical sensor B, while the signal line 8 is connected with the other end thereof.

In the liquid crystal panel having the construction as described above, upon application of a predetermined voltage corresponding to image data to the gate line 6 and the source line 7, the thin film transistor A is turned on, and a voltage is applied to the pixel electrode 5, and consequently, the liquid crystal cell is driven and hence an image is displayed. Upon application of a predetermined voltage to the gate line 6, electric current flows from the gate line 6 to the signal line 8 via the thin film optical sensor B on which light has been incident and as a result, the intensity of the light received is converted into an electric signal.

The construction and operation of the thin film transistor A and those of the thin film optical sensor B are described below in detail.

FIG. 37 is a detailed sectional view showing the vicinity of a substrate 11 of the liquid crystal panel shown in FIG. 36. The thin film transistor A constituting the switching element and the thin film optical sensor B constituting the light receiving element are formed on the inner side of one substrate 11 of the liquid crystal cell.

The thin film transistor A is formed as described below.

That is, a gate electrode 12a led from the gate line 6, a gate insulation layer 13, a semiconductor layer 14, and a heavily doped layer 15 are formed on the substrate 11. The source line 7 is connected with the semiconductor layer 14 via the heavily doped layer 15, and the drain electrode 9 is also connected with the semiconductor layer 14 via the heavily doped layer 15. The portion between the source line 7 and the drain electrode 9 forms a channel portion, and a light intercepting film 16 is formed above the channel portion. The drain electrode 9 is connected with the transparent pixel electrode 5.

The thin film optical sensor B is formed as described below.

That is, a gate electrode 12b led from the gate line 6 and the signal line 8 are formed on the substrate 11. The gate electrode 12b and the signal line 8 are connected with each other via a diode 17 and the thin film optical sensor B.

The diode 17 is constituted of a light intercepting film 18, an insulation film 19, a semiconductor layer 20, a heavily doped layer 21, and metal layers 22 and 23 laminated sequentially in this order. The gate electrode 12b and the semiconductor layer 20 are connected with each other via the metal layer 22, while the metal layer 23 and the semiconductor layer 20 are connected with each other via the heavily doped layer 21. A light intercepting film 24 is formed above the semiconductor layer 20.

The thin film optical sensor B is constituted of a light intercepting film 25, an insulation film 26, a photoconductive semiconductor layer 27, a heavily doped layer 28, and metal layers 23 and 29 laminated sequentially. The diode 17 and the thin film optical sensor B are connected with each other via the metal layer 23, while the metal layer 29 of the thin film optical sensor B is connected with the signal line 8.

In the thin film transistor A and the thin film optical sensor B having the construction as mentioned above, when a voltage is applied to the gate line 6, a voltage is applied to the gate electrode 12a of the thin film transistor A, with the result that carriers are generated in the channel portion adjacent to the gate electrode 12a of the semiconductor layer 14. When a voltage is applied to the source line 7 in this state, electric current flows from the source line 7 to the drain electrode 9 by the carriers in the semiconductor layer 14 and as a result, a driving voltage is applied to the pixel electrode 5.

A desired liquid crystal cell is driven by selecting a gate line 6 and a source line 7 to which a voltage is applied, and as a result, an image is displayed. The light intercepting film 16 is provided to prevent a malfunction from occurring owing to photoconductivity caused by the irradiation of the semiconductor layer 14 with external light.

Then, when a voltage is applied to the gate line 6, a voltage is applied to the gate electrode 12b of the diode 17. When the thin film optical sensor B is irradiated with external light in this state, the semiconductor layer 27 becomes conductive, and as a result, electric current flows to the signal line 8 from the gate electrode 12b through the metal layer 22, the semiconductor layer 20, the heavily doped layer 21, the metal layer 23, the heavily doped layer 28, the semiconductor layer 27, and the metal layer 29. Thus, which of the thin film optical sensors B connected with the voltage-applied gate line 6 has been irradiated is detected by detecting the signal line 8 through which electric current has flowed and the electric current is taken out as an output.

In this manner, two-dimensional optical information can be converted into an electric signal by applying a voltage to each gate line 6 sequentially and detecting electric current which has appeared on the signal line 8. The diode 17 is provided to prevent electric current from flowing from the signal line 8 to an unselected (namely, voltage-unapplied) gate line 6.

In Japanese Patent Publication No. 5-40927 "Image input/output apparatus" (hereinafter referred to as first prior art example), a light emitting diode is used as the light emitting element constituting the display element 2a. In Japanese Laid-Open Patent Publication No. 63-163886 "Display/input liquid crystal panel" (hereinafter referred to as second prior art example), both of the liquid crystal panel and the backlight are ON/OFF-controlled for each pixel and are substituted for the light emitting elements. In the second prior art as well, the liquid crystal panel and the backlight are sequentially ON/OFF-controlled for each pixel to irradiate an original document, and light reflected by the original document is received by the thin film optical sensor B and a photoelectric conversion is performed to read the density pattern of the original document, as done in the first prior art example.

In the first prior art example, however, when the image input/output panel is operated as the image input apparatus, the display element is used as the light emitting element, and light emitted by the light emitting element (display element) and reflected by the surface of the original document is received by the light receiving element making a pair with the light emitting element. Thus, the first prior art example has a problem that a sufficient resolution cannot be obtained when an image is inputted, due to the direction characteristic of light emitted by the light emitting element. On the other hand, in the second prior art example in which the liquid crystal panel and the backlight are substituted for the light emitting elements, light emitted by the liquid crystal cell has a peculiar emission direction characteristic. Thus, the second prior art example has a peculiar problem.

The reason why the problems occur is described below.
(1) Problem relating to the resolution in the first prior art example FIG. 38 shows a state in which in the first prior art, a pattern written in the original document 3 is being inputted to the apparatus. Light emitted by the light emitting element (display element) 2a of a pixel 2 and reflected at a point d positioned on the surface of the original document 3 enters the associated light receiving element 2b of the pixel 2 so as to be photoelectrically converted. At this time, if the path of light to be incident on a light receiving element 2b is only an optical path a from the associated light emitting element 2a, reflected light having an intensity corresponding to the density of only the dot d of the original document 3 is inputted to the light receiving element 2b. Thus, the image input/output panel of the first prior art operates favorably.

However, according to the emission direction characteristic of the light emitting element 2a, light is not emitted only in the direction of the optical path a. For example, as shown in FIG. 39, the light emitting element 2a has the emission direction characteristic that light is diffused broadly with respect to a perpendicular to an emission surface of the light emitting element 2a. Accordingly, as shown in FIG. 38, as the optical path to the light receiving element 2b, not only the optical path a, but also optical paths b and b from the light emitting elements of the adjacent pixels are present.

As a result, not only a light beam (light beam along optical path a) emitted by the light emitting element 2a and reflected at the dot d positioned on the original document 3, but also light beams (light along optical paths b and c) emitted by a light emitting element 2a' and a light emitting element 2a" and reflected at dots e and f positioned on the original document 3 enter the light receiving element 2b simultaneously. Thus, the light beams reflected at a plurality of dots positioned on the original document 3 arrive at the same light receiving element 2b simultaneously.

When the light beams reflected at a plurality of dots positioned on the original document 3 have arrived at a light receiving element 2b simultaneously, density information at a dot of the original document 3 is detected by a plurality of light receiving elements 2b positioned in the vicinity thereof. As a result, the density information at the dot on the original document 3 obtained from an electric signal photoelectrically converted by the image display/input panel is blurred. That is, the problem that a sufficient resolution cannot be obtained when an image is inputted occurs.

Similarly to the first prior art example, such a problem occurs in the second prior art example in which the liquid crystal panel and the backlight are substituted for the light emitting elements 2a in the first prior art and in which respective pixels on the liquid crystal panel are sequentially turned on and off.

(2) Problem peculiar to the second prior art example

In the second prior art example in which the liquid crystal panel and the backlight are substituted for the light emitting elements of the first prior art and in which respective pixels on the liquid crystal panel are sequentially turned on and off, the emission direction characteristic of light emitted from the liquid crystal cell is a peculiar characteristic. Thus, a peculiar problem occurs. This problem is described below.

FIG. 40 shows an example of the emission direction characteristic of light issued by the pixel. In the state in which a specific pixel 32 of a liquid crystal panel 31 is turned on, light having a high intensity is emitted by the pixel 32 not only in a direction perpendicular to the pixel 32 but also in approximately horizontal directions, as shown by a solid line. Even in a state in which the pixel 32 is OFF, as shown by a dotted line, light having a high intensity remains in the approx. horizontal directions. That is, regardless of whether the pixel on the liquid crystal panel is ON or OFF, optical emission having a high intensity is present in the approx. horizontal directions.

This means that in the second prior art example, the pixel 32 irradiates a plurality of dots of the original document, and light beams reflected by the dots of the original document reach one light receiving element at the same time, regardless of whether the pixel 32 is ON or OFF, similarly to the emission direction characteristic of the light emitting element 2a of the first prior art example shown in FIG. 39.

That is, in sequentially turning on and off the respective pixels 12 by using the liquid crystal panel and the backlight, the principle of irradiating the original document by only the pixels 12 which have been turned on cannot be satisfied. Thus, the emission direction characteristic of the light emitting element causes not only a problem that an image is inputted at a low resolution and but also a problem that an image inputting operation itself cannot be performed.

SUMMARY OF THE INVENTION

It is accordingly an object of the present invention to provide an image display/input apparatus allowing an image to be inputted by means of a liquid crystal panel and preventing an image from being inputted at a low resolution by irradiating a specific small portion of an original document by only pixels which have been turned on.

In order to accomplish the above object, an image display/input apparatus according to the present invention comprises:

a flat backlight for emitting light beams from a surface thereof;

an image display/input panel constituted of a liquid crystal display panel wherein a light receiving element is incorporated in each pixel;

means for receiving the light beams emitted by the backlight and outputting light beams substantially perpendicularly to the image display/input panel, said means being disposed between the backlight and the image display/input panel; and a control circuit for controlling the image display/input panel such that in displaying an image, each pixel is turned on or off according to image data so as to display an image corresponding to the image data, and that in inputting an image, the pixels are sequentially turned on and off to scan an original document which is placed on the image display/input panel with a surface thereof having optical density information being in contact with the image display/input panel.

According to the present invention, a particular small portion or dot of the original document can be irradiated with light beams from a particular pixel in the image display/input panel during an image input operation. The light beams reflected by the particular pixel is received by a light receiving element incorporated in the particular pixel. Accordingly, an image is inputted at a high resolution.

Furthermore, only parallel light beams in perpendicular directions can be allowed to enter the image display/input panel. Thus, the optical transmission-direction characteristic proper to a liquid crystal panel that pixels in an off state emit light horizontally by pixels can be improved. Accordingly, the original document can be scanned by light beams emitted only by pixels in an on state. That is, the present invention enables an image input using both the liquid crystal panel and the backlight as light emitting elements.

In an embodiment, the said means comprises an emission direction characteristic-forming plate having such an optical transmission/direction characteristic that allows only light beams which are incident on a surface thereof at generally right angles therewith to pass therethrough and forming an emission direction characteristic of the backlight.

In the above arrangement, only light beams which have been emitted by the backlight and incident on the emission direction characteristic-forming plate at right angles therewith pass therethrough, thus reaching the image display/input panel. Then, under the control of the control circuit, each pixel of the image display/input panel is turned on or off according to image data so as to display an image corresponding to the image data on the image display/input panel.

In an image input operation, as in the image display operation, light beams which have been emitted by the backlight are adjusted to progress in perpendicular directions, thus reaching the image display/input panel. Under the control of the control circuit, respective pixels of the image display/input panel are sequentially turned on and off to scan an original document placed on the image display/input panel.

The emission direction characteristic-forming plate can be formed of two transmitting flat plates, side surfaces of which are opposed to each other; and a plurality of light-intercepting flat plates mounted on the opposed side surfaces of the transmitting flat plates at right angles therewith and partitioning a gap between the transmitting flat plates into a plurality of spaces.

In this arrangement, light beams emitted by the backlight pass through one of the transmitting flat plates of the emission direction characteristic-forming plate, thus being incident on the emission direction characteristic-forming plate. At this time, light beams which have been incident on the transmitting flat plate at right angles therewith pass through the space between the light-intercepting flat plates, thus being emitted toward the image display/input panel from the other transmitting flat plate. Light beams which have been obliquely incident on one transmitting flat plate are intercepted by the light-intercepting flat plates and thus are not emitted from the other transmitting flat plate.

In this manner, the backlight can have a vertical directive characteristic, i.e., the light beams emitted by the backlight are allowed to progress in vertical directions.

The emission direction characteristic-forming plate having the construction as described above can be manufactured at a lower cost and mass-produced more easily than in a case wherein the emission direction characteristic-forming plate is constituted on an optical system such as lenses.

If the emission direction characteristic-forming plate has been processed so as to be nonreflective, light beams which have been emitted by the backlight and obliquely incident on the emission direction characteristic-forming plate are diffused by the emission direction characteristic-forming plate. On the other hand, when the emission direction characteristic-forming plate is painted black, light beams which have been emitted by the backlight and obliquely incident on the emission direction characteristic-forming plate are absorbed by the emission direction characteristic-forming plate. In this manner, the light beams which have been obliquely incident on the incident surface of the emission direction characteristic-forming plate can be reliably prevented from being reflected and outputted from the emission direction characteristic-forming plate. That is, the emission direction characteristic is optimally formed by the plate.

In another embodiment, the above means comprises an optical control plate which exhibits an optical transmission property or an optical diffusion property according to a change of an electric signal so as to control a direction characteristic of the light beams, and wherein said control circuit further controls the electric signal to be inputted to the optical control plate such that in displaying an image, the optical control plate has the optical diffusion property and that in inputting an image, the optical control plate has the optical transmission property.

In this apparatus with this construction, in inputting an image, an electric signal to be inputted to the optical control plate is controlled by the control circuit so that the optical control plate exhibits the optical diffusion property. As a result, parallel light beams emitted in perpendicular directions by the backlight are diffused by the optical control plate and the diffused light reaches the image display/input panel. Then, the control circuit controls ON and OFF of each pixel of the image display/input panel according to image data so as to display an image corresponding to the image data on the image display/input panel.

In inputting an image, under the control of the control circuit, the electric signal to be inputted to the optical control plate is controlled by the control circuit so that the optical control plate has the optical transmission property. As a result, parallel light beams emitted in perpendicular directions by the backlight pass through the optical control plate and reach the image display/input panel. Then, under the control of the control circuit, respective pixels of the image display/input panel are sequentially turned on and off so as to scan the original document.

Consequently, in the image input operation, light beams emitted by the turned-on pixel of the image display/input panel perpendicularly and reflected by the original document are received by only the light receiving element incorporated in the turned-on pixel. In this manner, the image input operation can be reliably performed.

The apparatus may further comprise a light condensing means disposed between the backlight and the optical control plate for condensing the light beams emitted from the backlight. In this case, parallel light beams emitted in perpendicular directions by the backlight are condensed by the light-condensing means before they reach the image display/input panel. Therefore, the condensed light beams outputted from the turned-on pixel reach a particular small portion of the underside of the original document. Therefore, when an image input operation is performed, light beams emitted by the turned-on pixel of the image display/input panel perpendicularly and reflected by the particular small portion of the original document are reliably received by only the light receiving element incorporated in the turned-on pixel. In this manner, the image input operation can be reliably performed at a high resolution. Furthermore, light beams reflected from the original document are incident on the light receiving element with no or little loss. Thus, the light receiving element can receive a great amount of light, and thus a signal-to-noise ratio is improved.

The light-condensing means can be made of a microlens array, which can be mass produced at a low cost.

Preferable, a pitch of microlenses in the microlens array is equal to a pixel pitch of the image display/input panel. Hence, undesired Moire fringe can be prevented from occurring.

Furthermore, preferably, a focal length of each microlens is equal to or longer than a distance between an upper surface of the microlens and an upper surface of the image display/input panel. With this arrangement, a focal point of the microlens of the microlens array is set on the upper surface of the image display/input panel or at a level higher than the upper surface of the image display/input panel.

Thus, in the image input operation, light beams which have left the optical control plate at right angles therewith are reliably gathered at the particular small portion of the underside of the original document.

Thus, all light beams reflected by the particular small portion of the underside of the original document are reliably received by only the light receiving element incorporated in the turned-on pixel. Hence, the image input operation can be performed at a high resolution and a high signal-to-noise ratio.

In an embodiment, the said means comprises a directive plate which consists of two prism sheets each having a flat surface and an opposed uneven surface having prism-shaped concaves and convexes, wherein the prism sheets are superimposed on each other in such a manner that a direction in which the concaves and the convexes of one prism sheet extend is perpendicular to a direction in which the concaves and the convexes of the other prism sheet extend, and wherein each convex of the prism sheets has a vertical angle θ in a range from 90° to 120°.

This apparatus operates as follows.

In an image display operation, light beams coming from the backlight and incident on a flat incident surface of the directive plate are refracted at the prism-shaped convexes having a vertical angle θ of 90°–120° while the light beams are passing through the directive plate. As a result, progress directions of the light beams are changed to directions perpendicular to the incident surface of the directive plate. Thus, the light beams reach the image display/input panel at right angles therewith. Under the control of the control circuit, each pixel of the image display/input panel is turned on or off according to image data so as to display an image corresponding to the image data on the image display/input panel.

In an image input operation, as in the image display operation, the light beams emitted by the backlight are changed in progress direction by the directive plate and thus enter the image display/input panel perpendicularly thereto. Under the control of the control circuit, respective pixels of the image display/input panel are sequentially turned on and off to scan an original document placed on the image display/input panel.

As obvious from the above, in the image input operation, light beams outputted from a turned-on pixel is reflected by a dot of the original document and received by only a light receiving element incorporated in the turned-on pixel. In other words, different light receiving elements receive light reflected by different points of an original document. As a result, deterioration of the resolution can be prevented and an image is input at a high resolution.

The directive plate can converge the light beams emitted by the backlight to a direction perpendicular to its flat surface, so that in inputting an image, the original-document irradiation luminance and hence the signal-to-noise ratio can be improved.

Further, because the directive sheet is composed of the prism sheets, it is manufactured at a lower cost and also mass-produced easily, as compared with the case in which the directive sheet is composed of lenses.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention is described below in detail with reference to drawings.

(First Embodiment)

Figure 1:
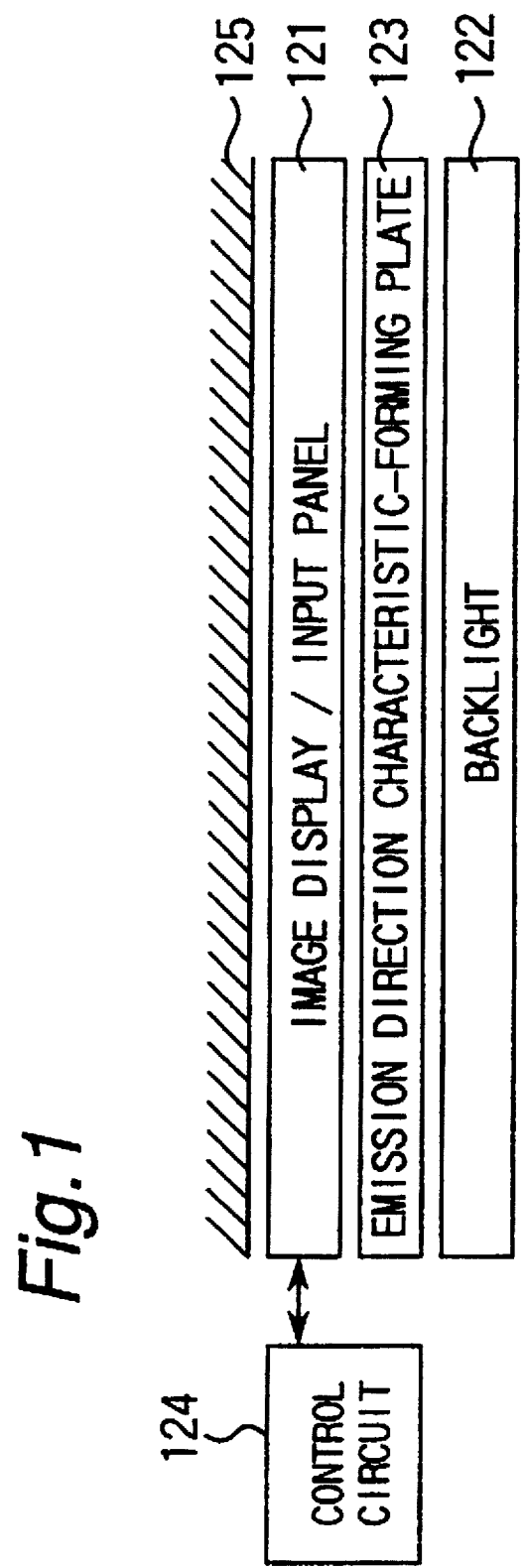
FIG. 1 is a schematic view showing the construction of an image display/input apparatus according to a first embodiment of the present invention.

FIG. 1 schematically shows the construction of an image display/input apparatus according to the first embodiment.

Figure 36:
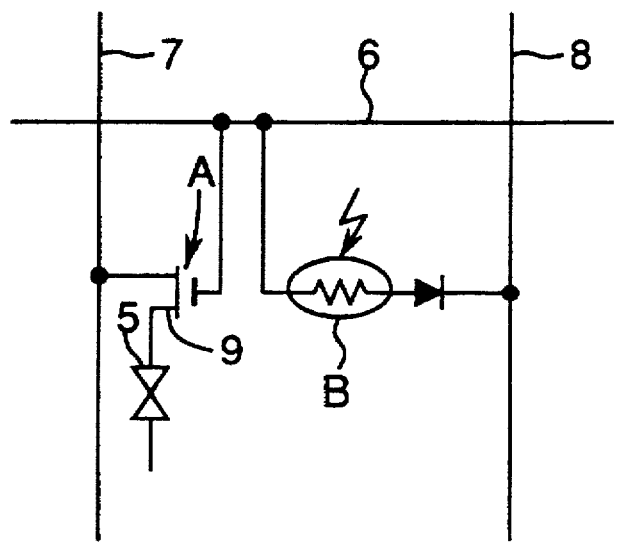
FIG. 36 is a sectional view showing the construction of a conventional liquid crystal panel having a light receiving element incorporated in a pixel.
Figure 38:
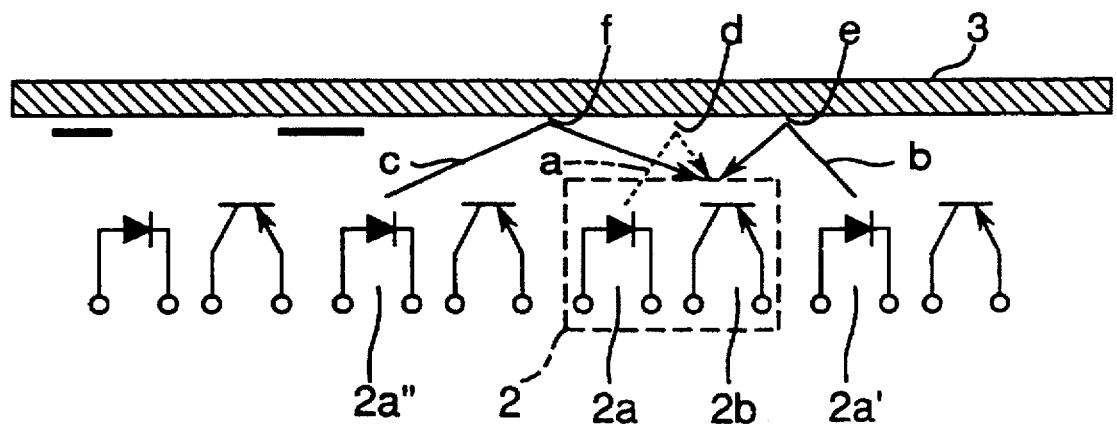
FIG. 38 is an explanatory diagram showing problems of the image display/input panel shown in FIG. 33.

In FIG. 1, reference numeral 121 denotes an image display/input panel in which one pixel is formed of a liquid crystal display element and a light receiving element, as in the panel shown in FIG. 36, thus having both an image display function and an image input function. Reference numeral 122 denotes a backlight which functions as a light emitting element together with pixels of the image display/input panel 121. Reference numeral 123 denotes an emission direction characteristic-forming plate which is an important constituent element of the image display/input apparatus according to this embodiment. Reference numeral 124 denotes a control circuit for controlling the image display/input panel 121 to execute an image display operation and an image input operation.

In operating the image display/input apparatus having the above construction as an image input apparatus, an original document 125, the image of which is to be inputted is placed on the image display/input panel 121, with an ink-printed surface thereof opposed to the image display/input panel 121.

Figure 2:
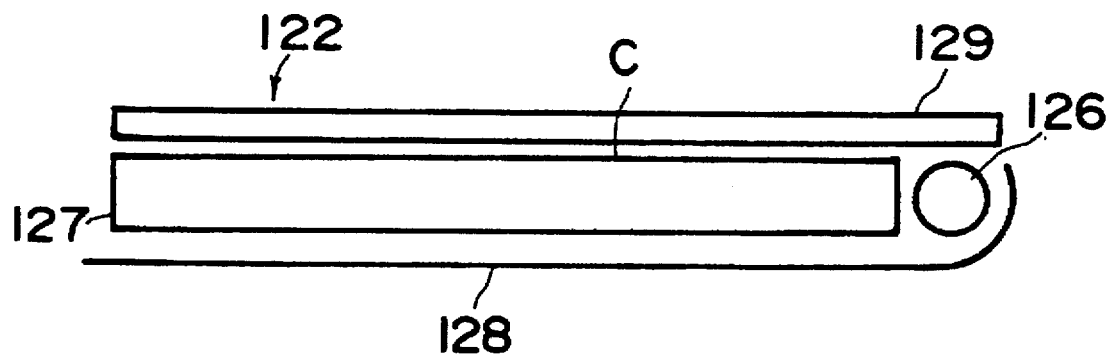
FIG. 2 is a sectional view of a backlight shown in FIG. 1.
Figure 3:
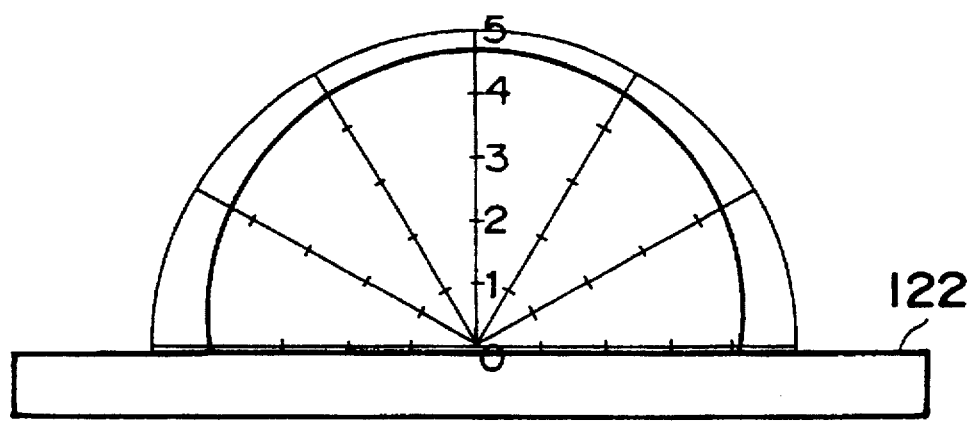
FIG. 3 is a diagram showing the emission direction characteristic of the backlight shown in FIG. 2.

As shown in FIG. 2, the backlight 122 comprises a fluorescent lamp 126, a light-leading plate 127, a reflection plate 128, and a diffusion plate 129. Light beams emitted from the fluorescent lamp 126 are reflected toward the light-leading plate 127 by the reflection plate 128, thus being transmitted through the light-leading plate 127 and emitted toward the diffusion plate 129 from an emission surface C of the light-leading plate 127. In this manner, the light beams emitted from the emission surface C are diffused to the space by the diffusion plate 129. Because the light beams have been diffused, they expand broadly with respect to a perpendicular of the emission surface, as shown in FIG. 3.

Figure 4:
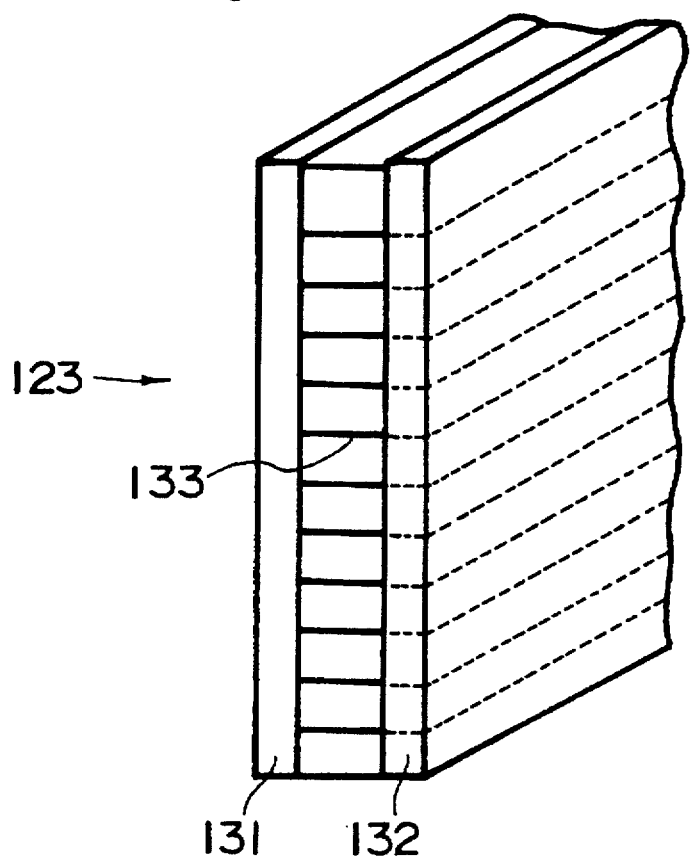
FIG. 4 is an enlarged perspective view showing an emission direction characteristic-forming plate shown in FIG. 1.

As shown in FIG. 4, the emission direction characteristic-forming plate 123 consists of transmitting flat plates 131 and 132, whose side faces are opposed to each other, for transmitting light beams emitted from the backlight 122 therethrough; and a plurality of light-intercepting flat plates 133 mounted on the transmitting flat plates 131 and 132 at right angles therewith and partitioning the gap between the transmissive flat plates 131 and 132 at regular intervals.

Figure 5:
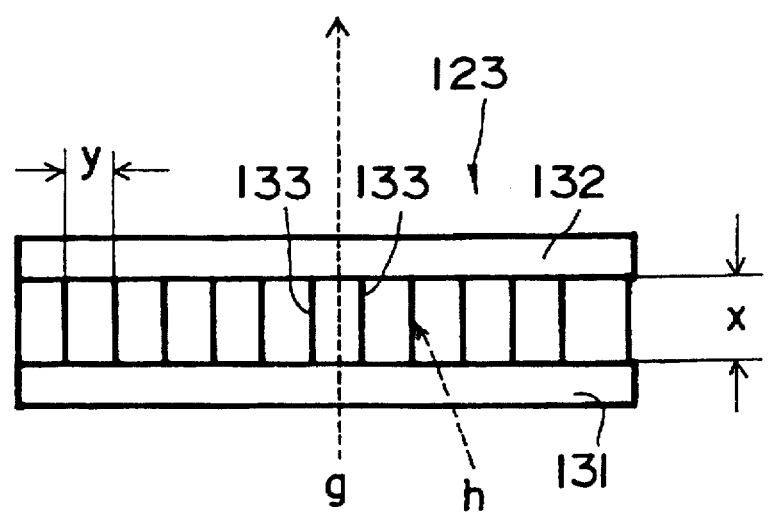
FIG. 5 is an explanatory view showing the operation of the emission direction characteristic-forming plate shown in FIG. 4.

As shown in FIG. 5, a light beam g which has been incident on the lower surface of the transmitting flat plate 131 at a right angle therewith passes therethrough, then passing between the light-intercepting flat plates 133 and 133 and becoming incident on the upper transmissive flat plate 132. Then, the light beam g passes through the transmitting flat plate 132, thus leaving it and progressing toward the image display/input panel 121. A light beam h which has been obliquely incident on the lower surface of the transmitting flat plate 131 passes therethrough and is incident on the side surface of the light-intercepting flat plate 133, thus being prevented from progressing out from the transmitting flat plate 132. That is, the emission direction characteristic-forming plate 123 operates as a filter for transmitting only the light beam g incident on the lower surface of the transmitting flat plate 131 perpendicularly.

The performance characteristic of the emission direction characteristic-forming plate 123 when functioning as the filter is determined by the spacing x between the transmitting flat plates 131 and 132 and the pitch y of the light-intercepting flat plates 133. That is, when the transmitting flat plates 131 and 132 transmit a light beam inclined at an angle within ±10° with respect to a perpendicular direction, x and y satisfying the following condition are selected.

arctan (y/x)<10°

That is, the spacing x between the transmissive flat plates 131 and 132 is selected to be about five to six times as large as the pitch y of the light-intercepting flat plates 133.

As described in detail later, because the image display/input panel 121 is overlaid on the emission direction characteristic-forming plate 123, Moire may occur, depending on the relationship between the pitch y of the light-intercepting flat plates 133 and the pixel pitch z of the image display/input panel 121. Therefore, the pitch y of the light-intercepting flat plates 133 is required to be exactly equal to the pixel pitch z of the image display/input panel 121 or to be neglectably small. That is, y=z or y<<z.

Generally, because the pixel pitch z of the image display/input panel 121 is approximately 200 microns—300 microns, the pitch y of the light-intercepting flat plates 133 is tens of microns or preferably 200 microns to 300 microns, i.e., completely equal to the pixel pitch z.

Because the light-intercepting flat plate 133 is used to intercept light beams, preferably, the surface thereof is treated so as to be nonreflective or painted black.

Figure 6:
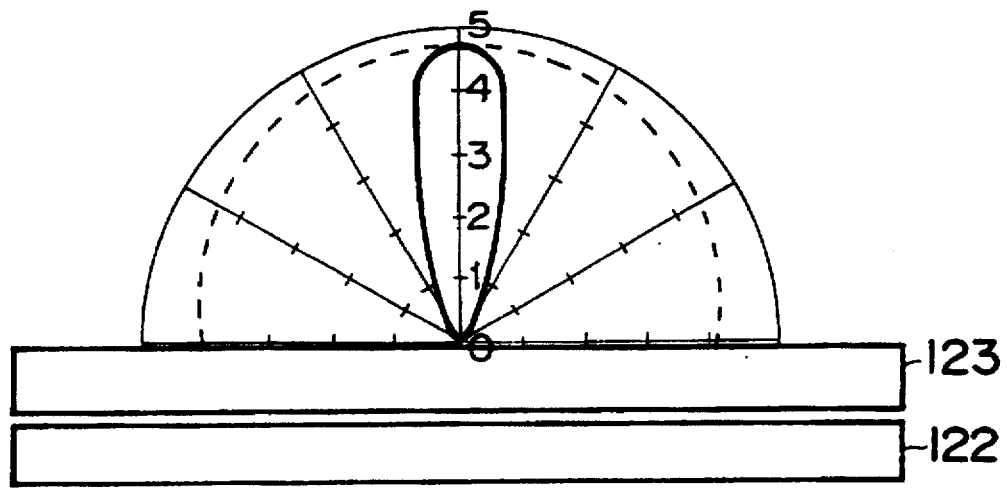
FIG. 6 is a diagram showing an optical emission direction characteristic exhibited by the backlight and the emission direction characteristic-forming plate, shown in FIG. 1, laminated on each other.

In this embodiment, the emission direction characteristic-forming plate 123 is used overlaid on the backlight 122 having the optical emission direction characteristic shown in FIG. 3. The optical emission direction characteristic to be displayed when the emission direction characteristic-forming plate 123 is overlaid on the backlight 122 is as shown in FIG. 6. Dotted lines indicate the optical emission direction characteristic of the backlight 122.

As is obvious from FIG. 6, when the emission direction characteristic-forming plate 123 is used and when the spacing x and the pitch y satisfy the expression of arctan y/x<10°, those light beams of an inclination angle of greater than ±10° with respect to the vertical direction are not emitted. That is, the optical emission direction characteristic of the backlight 122 is improved in such a manner that light beams are emitted in only substantially perpendicular directions.

The backlight 122 and the emission direction characteristic-forming plate 123 are placed below the image display/input panel 121.

In displaying an image by the image display/input apparatus having the above construction, similarly to the second prior art example, a voltage corresponding to image data is applied to the pixel electrode of each pixel of the image display/input panel 121 and the pixels are turned on or off to display the image on the panel.

In inputting an image, a voltage is applied to only the pixel electrode of a pixel opposed to a particular dot of the original document 125 which is to be inputted, so that the pixel is turned on, while no voltage is applied to the pixel electrodes of the other pixels to turn them off. In this manner, the particular dot on the original document 125 is irradiated by a light beam emitted by the corresponding pixel in an ON state, and the light beam reflected at the dot is photoelectrically converted by means of the corresponding light receiving element (not shown) incorporated in the pixel. In this way, image data of all dots of the original document 125 are sequentially inputted.

Figure 8:
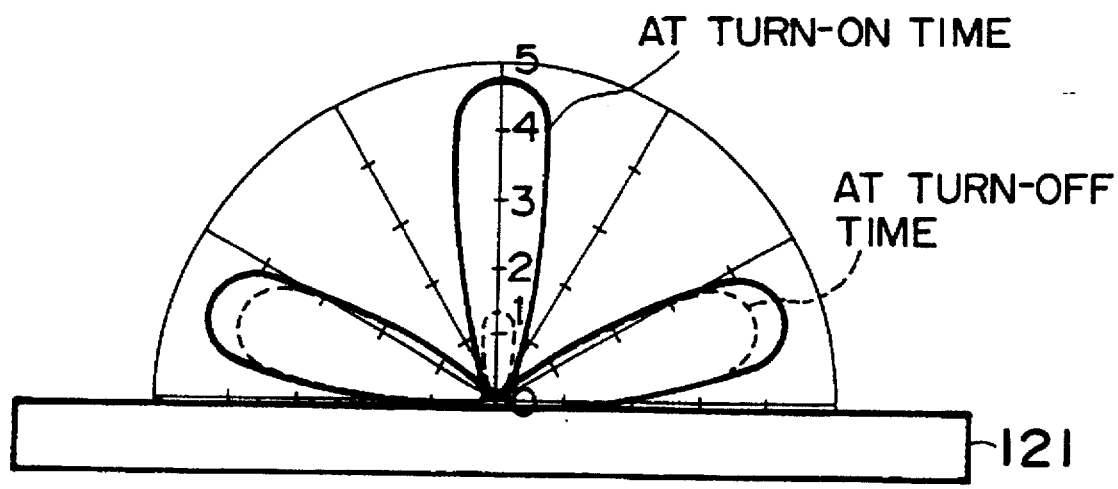
FIG. 8 is a diagram showing the optical transmission-direction characteristics of the image display/input panel shown in FIG. 1.
Figure 40:
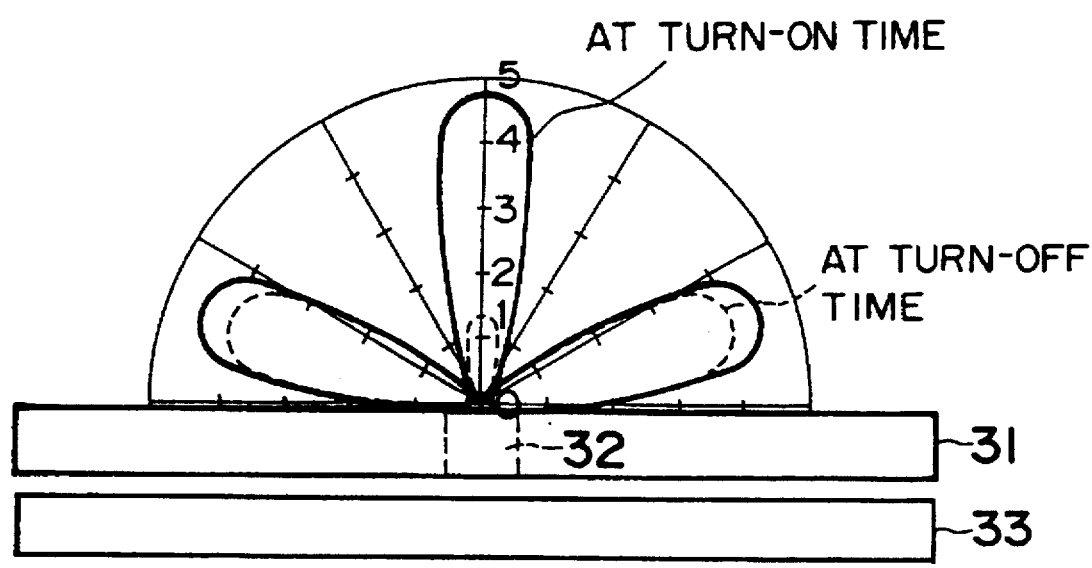
FIG. 40 is a diagram showing the optical emission direction characteristic of the liquid crystal panel shown in FIG. 36.

In the conventional art, the backlight having the optical emission direction characteristic as shown in FIG. 3 is laminated on the image display/input panel having an optical transmission direction characteristic that the transmittance is high in a direction approximately horizontal, irrespective of ON or OFF of pixels; and that the transmittance is high in the vertical direction when the pixels are ON, and low in the vertical direction when the pixels are OFF (refer to FIG. 8). Thus, an optical emission direction characteristic as shown in FIG. 40 is provided.

Figure 7:
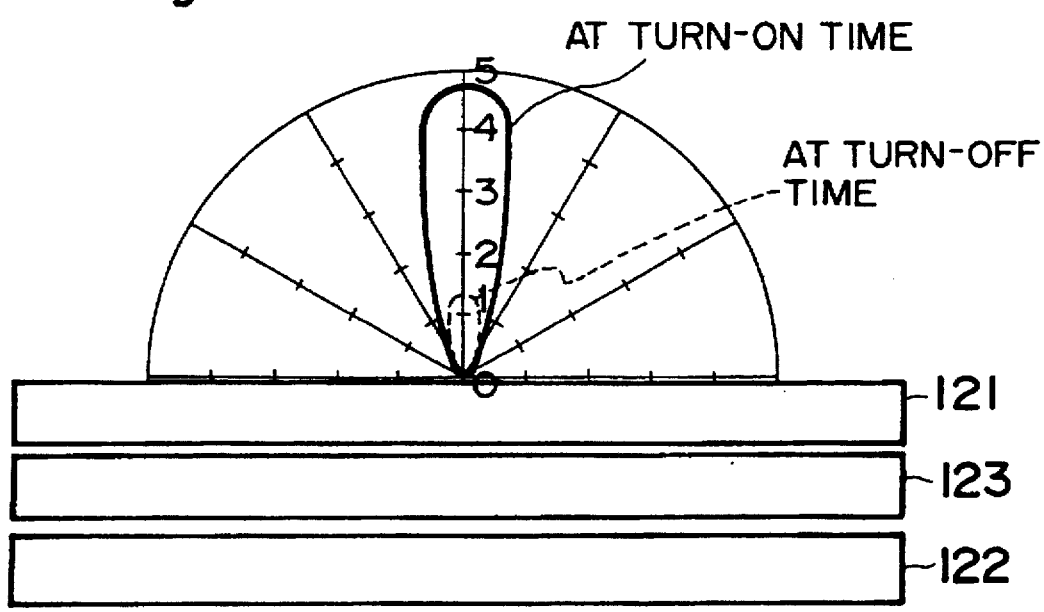
FIG. 7 is a diagram showing an optical emission direction characteristic exhibited by the backlight, the emission direction characteristic-forming plate, and an image display/input panel, all shown in FIG. 1, laminated on each other.

Unlike the conventional art, in the embodiment, the emission direction characteristic-forming plate 123 is overlaid on the backlight 122, and the image display/input panel 121 is overlaid on the emission direction characteristic-forming plate 123 to construct the image display/input apparatus. By overlaying the emission direction characteristic-forming plate 123 on the backlight 122, the optical emission direction characteristic is improved as shown in FIG. 6, and hence an optical emission in a direction approximate to the horizontal direction hardly occurs. Consequently, even though the image display/input panel 121 having the optical transmission-direction characteristic as shown in FIG. 8 is overlaid on the emission direction characteristic-forming plate 123, an optical emission in a direction approximate to the horizontal direction does not occur, irrespective of ON or OFF of the pixels of the image display/input panel 121, and light beams are emitted in only substantially vertical directions when the pixels are turned on, as shown in FIG. 7.

Thus, the apparatus enables the input of an image by using the image display/input panel 121 having the same optical transmission/direction characteristic as that of a liquid crystal panel. Further, in an image input operation, the apparatus prevents the incidence on a turned-on pixel of a reflected light beam emitted by an adjacent pixel, thus increasing a resolution in inputting the image.

The control circuit 124 drives the image display/input panel 121 in accordance with image data in displaying an image, thus allowing the image display/input panel 121 to display the image thereon in accordance with the image data. In inputting an image, the control circuit 124 sequentially turns on and off the pixels of the image display/input 121 to scan the original document 125 and processes electric current corresponding to the density of the original document 125 detected by the light receiving element incorporated in the pixel which has been turned on, thus taking out image data.

As described above, in the embodiment, the emission direction characteristic-forming plate 123 is interposed between the image display/input panel 121 and the backlight 122. The emission direction characteristic-forming plate 123 comprises the transmitting flat plates 131 and 132 whose side faces are opposed to each other; and the light-intercepting flat plates 133 partitioning the gap between the transmitting flat plates 131 and 132 at regular intervals so as to intercept light beams from being incident on the incident surface of the emission direction characteristic-forming plate 123 at an angle greater than 10° with respect to a perpendicular to the incident surface.

Accordingly, in inputting an image, only one dot of the original document positioned in a direction perpendicular to the pixel which has been turned on is irradiated, so that the density of the dot can be detected according to the intensity of a light beam reflected from the dot.

In addition, the pixel of the image display/input panel 121 which has been turned off does not emit light beams in the direction substantially horizontal, and the original document can be scanned by only the optical emission of the pixel which has been turned on. Thus, the image input can be accomplished by using a liquid crystal panel.

Further, because the surface of the light-intercepting flat plates 133 of the emission direction characteristic-forming plate 123 is nonreflectively treated or painted in black, light beams are not reflected by the light-intercepting flat plates 133 and thus, the improvement of the optical emission direction characteristic can be accomplished with high efficiency.

(Second Embodiment)

Figure 9:
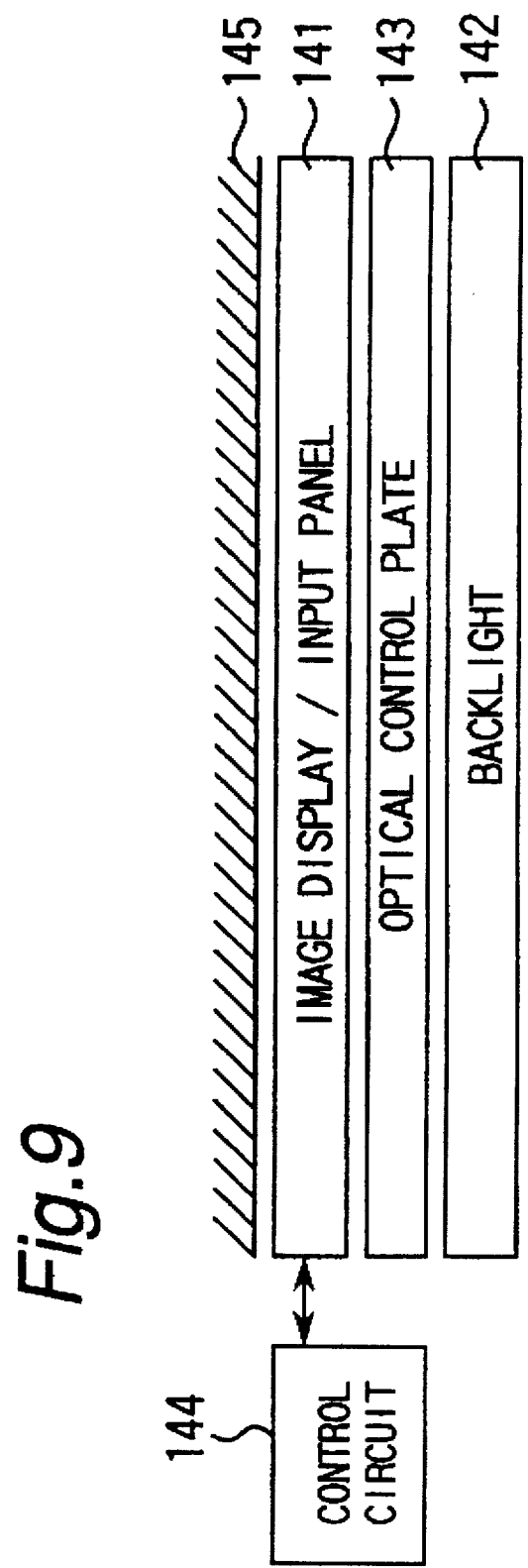
FIG. 9 is a schematic view showing the construction of an image display/input apparatus according to a second embodiment of the present invention.

FIG. 9 schematically shows the construction of an image display/input apparatus according to this embodiment.

In FIG. 9, reference numeral 141 denotes an image display/input panel; 142 denotes a backlight; 143 denotes an optical control plate which is an important constituent element of the apparatus according to this embodiment; 144 denotes a control circuit; and 145 denotes an original document. The image display/input panel 141 is identical to the image display/input panel 121 according to the first embodiment and has pixels incorporating light receiving elements, thus having an image display operation and an image input operation.

Figure 10:
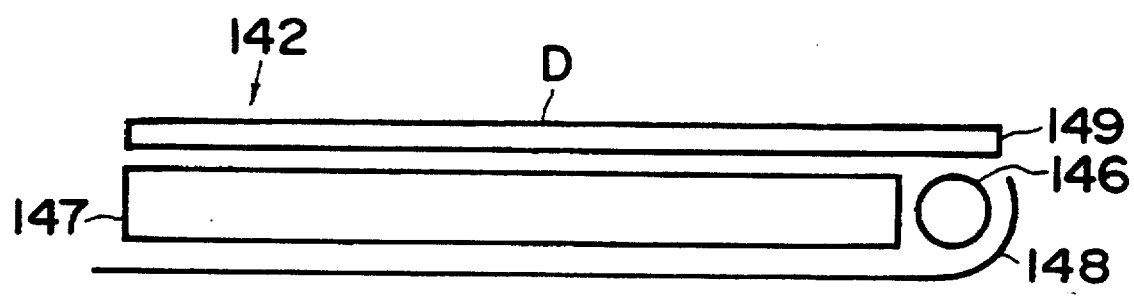
FIG. 10 is a sectional view of a backlight shown in FIG. 9.

As shown in FIG. 10, the backlight 142 essentially consists of a fluorescent lamp 146, a light-leading plate 147, a reflection plate 148, and a protection plate 149. Light beams emitted from the fluorescent lamp 146 are reflected toward the light-leading plate 147 by the reflection plate 148, thus being transmitted through the light-leading plate 147 and emitted in parallel with each other toward the optical control plate 143 from an emission surface D of the protection plate 147. The protection plate 149 is made of a substantially transparent resin plate and is provided to protect the entire backlight 142 mechanically.

In conventional liquid crystal display apparatuses, a backlight having a diffusion plate laminated on a protection plate 149 is placed under a liquid crystal panel for use as a light source for an image display. Otherwise, the protection plate 149 itself is allowed to function as a diffusion plate as well.

Figure 11:
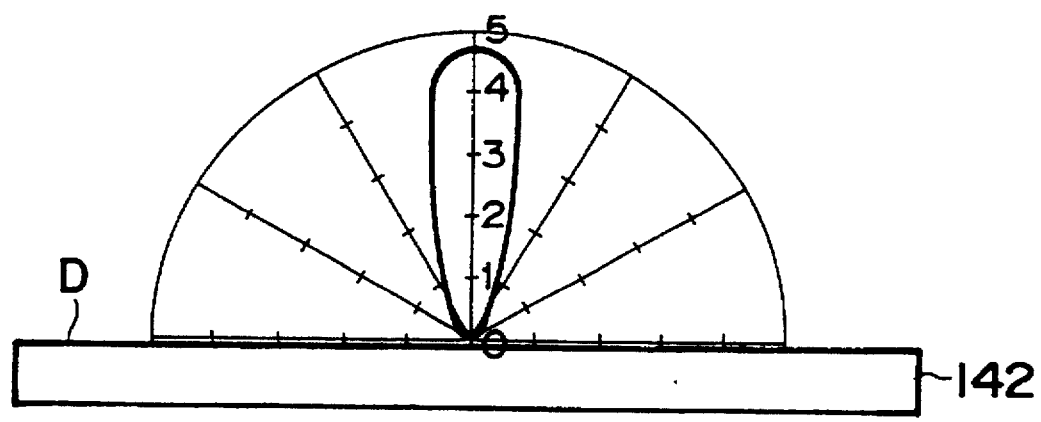
FIG. 11 is a diagram showing the emission direction characteristic of the backlight shown in FIG. 10.

FIG. 11 shows the optical emission direction characteristic for a slight area of the backlight 142 having the above construction. The backlight 142 according to this embodiment has characteristics that it emits light beams having a high intensity in directions generally perpendicular to the protection plate 149 and emits light beams having very decreased intensities in other directions. Because the emission surface D of the backlight 142 is an aggregation of slight areas having such an optical emission direction characteristic, the entire emission surface emits substantially parallel light beams.

Figure 14A:
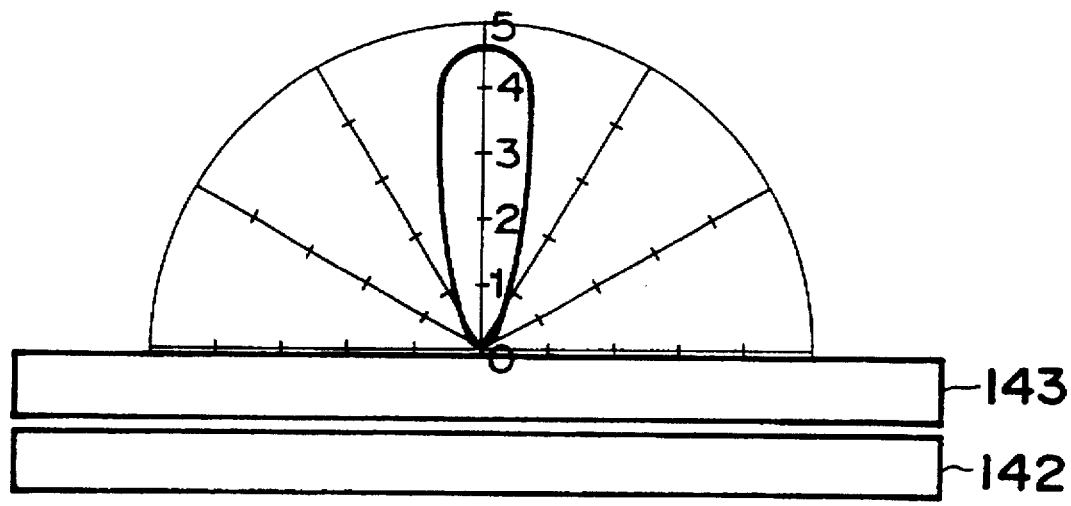
FIGS. 14A and 14B are diagrams showing optical emission direction characteristics exhibited by the backlight and the optical control plate, shown in FIG. 9, laminated on each other.
Figure 14B:
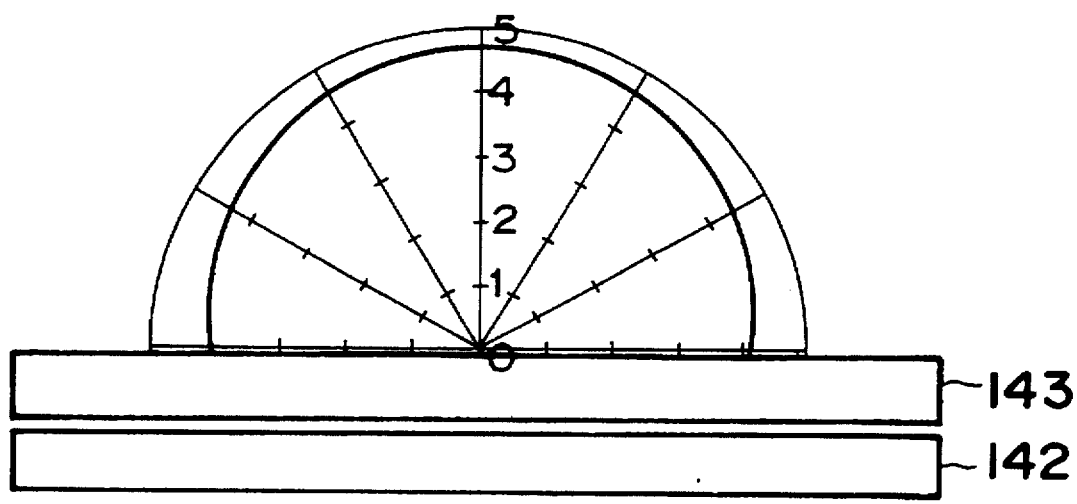
Figure 15:
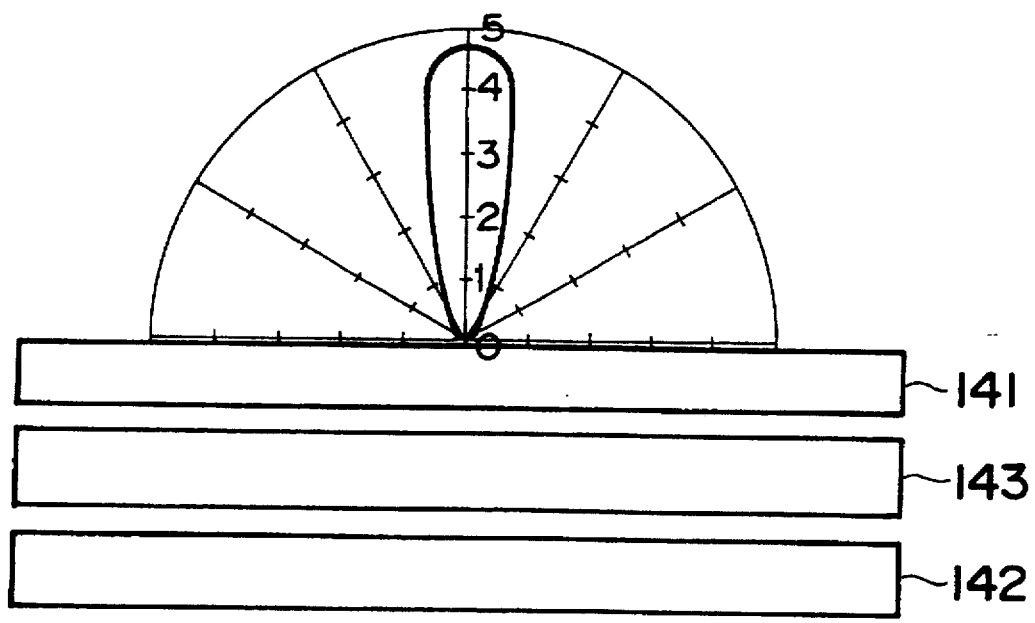
FIG. 15 is a diagram showing an optical emission direction characteristic displayed by the backlight, the optical control plate, and the image display/input panel, all shown in FIG. 9, laminated on each other.
Figure 16:
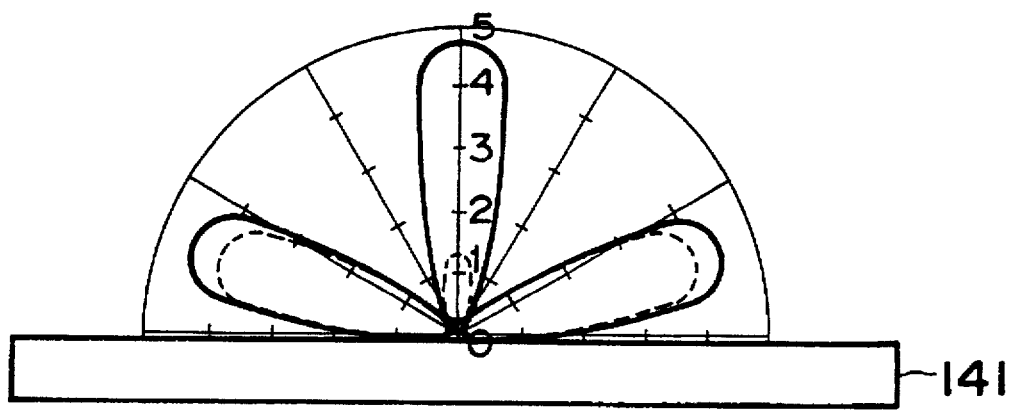
FIG. 16 is a diagram showing the optical transmission-direction characteristic of the image display/input panel shown in FIG. 9.

Optical emission direction characteristics shown in FIGS. 14A, 14B and 15 and optical transmission-direction characteristic shown in FIG. 16 are all for a slight area of each object. Thus, the aggregation of the direction characteristics of slight areas provides the direction characteristic of the entire object.

Figure 12:
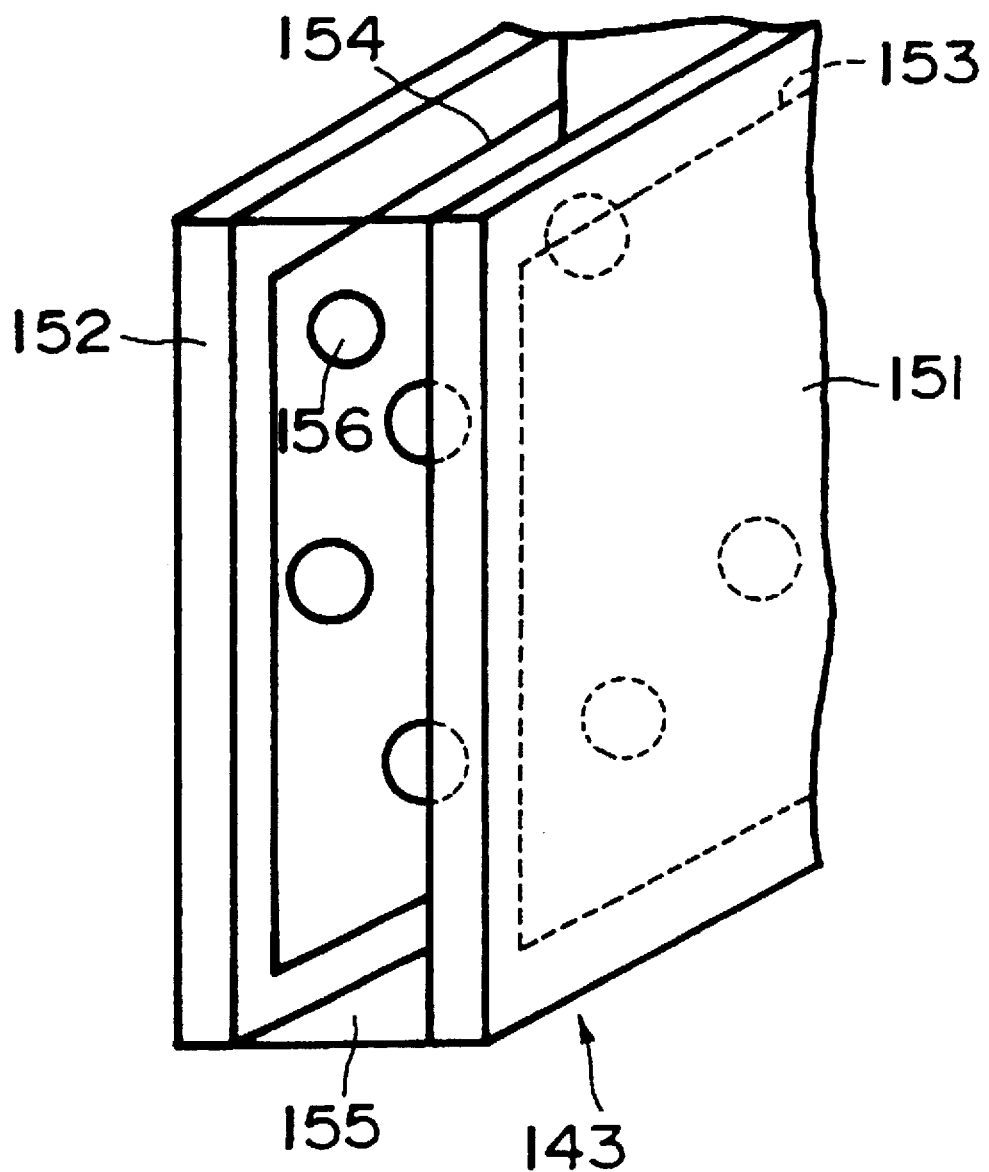
FIG. 12 is a partial enlarged perspective view of an optical control plate shown in FIG. 9.

As shown in FIG. 12, the optical control plate 143 has two opposed plastic films 151 and 152; transparent conductive films 153 and 154 formed on each of the inner surfaces of the plastic films 151 and 152; and polymer 155 and liquid crystal 156 both filled between the plastic films 151 and 152.

Figure 13B:
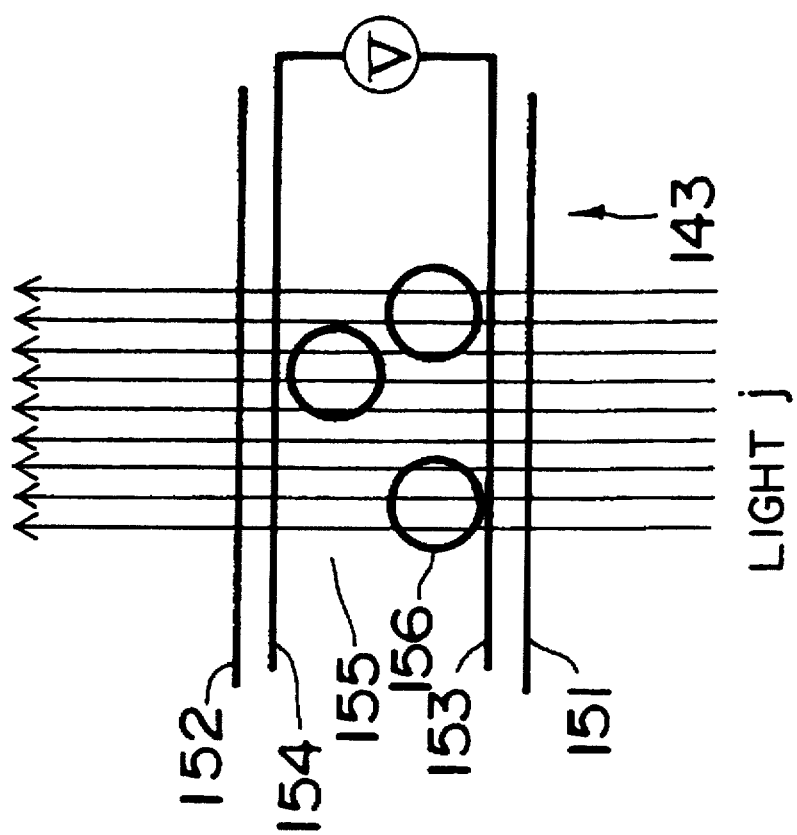
FIGS. 13A and 13B are explanatory views showing operations of the optical control plate shown in FIG. 12.
Figure 13A:
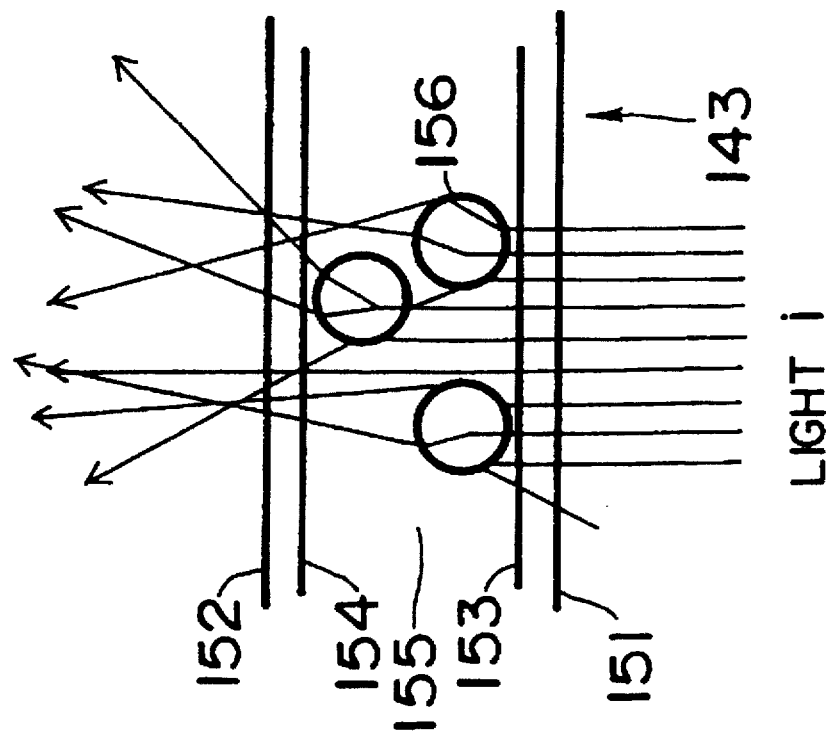

FIGS. 13A and 13B are explanatory views showing the operation of the optical control plate 143 having the above construction. FIG. 13A shows a state in which no voltage is applied across the portion between the transparent conductive films 153 and 154; and FIG. 13b shows a state in which a voltage is applied. The operation of the optical control plate 143 is described below with reference to FIGS. 13A and 13B.

When no voltage is applied to the portion between the transparent conductive films 153 and 154, the molecular orientation of the liquid crystal 156 becomes random. As a result, as shown in FIG. 13A, light beams i which have been incident on the lower surface of the plastic film 151 closer to the backlight 142 at right angles therewith are propagated in various directions along the direction of the molecular array of the liquid crystal 156 and issue from the plastic film 152 positioned on the side of the image display/input panel 141.

When a voltage is applied between the transparent conductive films 153 and 154, the molecular orientation of the liquid crystal 156 becomes uniform. As a result, as shown in FIG. 13B, light beams j which have been incident on the lower surface of the plastic film 151 at right angles therewith are propagated as generally parallel light beams in the vertical directions along the direction of the molecular array of the liquid crystal 156 and issue from the plastic film 152.

As described above, the optical control plate 143 which changes the optical transmission characteristic according to the application/nonapplication of a voltage, namely, electric signals can be easily formed by using a commercially available liquid crystal film (for example, trade name: UMU film) used for a store display or a video screen.

In this embodiment, as shown in FIG. 9, the optical control plate 143 is overlaid on the backlight 142 and mounted under the image display/input panel 141. Thus, the direction characteristic of light beams which are incident on the image display/input panel 141 can be changed as described below by controlling a voltage to be applied across the optical control plate 143 by means of the control circuit 144.

That is, when a voltage is applied to the portion between the transparent conductive films 153 and 154, parallel light beams emitted by the backlight 142 pass through the optical control plate 143 and progress in parallel with each other at substantially right angles with the emission surface of the optical control plate 143 toward the image display/input panel 141, as shown in FIG. 14A.

When a voltage is not applied to the portion between the transparent conductive films 153 and 154, the parallel light beams emitted by the backlight 142 are converted into scattered light beams while they are passing through the optical control plate 143 and scattered in various direction, as shown in FIG. 14B.

The operation of the image display/input apparatus having the above construction is described below in detail.

First, the operation of the image display/input panel 141 when displaying an image is described below.

In the image display operation, under the control of the control circuit 144, the image display/input panel 141 is operated similarly to a conventional liquid crystal display apparatus comprising a liquid crystal display panel and a backlight.

In the conventional liquid crystal display apparatus, by overlaying a diffusion plate on the backlight, a light source which can emit diffused light, i.e., which has an emission direction characteristic similar to that shown in FIG. 14B is formed. By providing the light source which emits diffused light beams on the rear surface of the liquid crystal panel, all pixels of the liquid crystal panel are irradiated simultaneously and uniformly.

In this embodiment, the optical control plate 143 is made to function similarly to the diffusion plate by applying no voltage to the portion between the transparent conductive films 153 and 154 of the optical control plate 143. That is, the diffusion light source is formed of the backlight 142 and the optical control plate 143 so as to irradiate all pixels of the image display/input panel 141 simultaneously and uniformly with light beams emitted by the diffusion light source as in the conventional liquid crystal display apparatus.

Thus, in the image display operation, the image display/input apparatus is operated similarly to the conventional liquid crystal display apparatus, according to the operation principle of the known liquid crystal display panel, so as to display an image on the image display/input panel 141 based on image data outputted from the control circuit 144.

The operation of the image display/input panel 141 in inputting an image of an original document is described below.

In the conventional image display/input panels, as described previously with respect to the second prior art example, only the pixel 12 of the liquid crystal panel 11 opposed to one dot, an input object, of an original document is turned on and the other pixels are turned off, the only one dot of the original document is irradiated with light emitted by the liquid crystal panel 11, and the light reflected at the dot are received by the light receiving element incorporated in the subject pixel 12.

The optical emission direction characteristic of the turned-on pixel obtained by the combination of the liquid crystal panel 11 and the backlight is as shown in FIG. 40. That is, the optical emission direction characteristic of the liquid crystal panel 11 is that in a direction approximate to the horizontal surface of the liquid crystal panel 11, the optical transmittance is high irrespective of whether pixels are turned on or off; and in the direction perpendicular to the horizontal surface of the liquid crystal panel 11, the optical transmittance is high when the pixels are turned on, and is low when the pixels are turned off.

The reason is as follows: Because the diffusion light source is formed by overlaying the diffusion plate (not shown in FIG. 40) on the backlight, the optical emission direction characteristic of light beams emitted from the diffusion light source is similar to that shown in FIG. 14B. Further, the liquid crystal panel 11 is overlaid on the diffusion plate, and thus, the optical emission direction characteristic becomes as shown in FIG. 40. Such an optical emission direction characteristic is displayed as well when the image display/input panel 141 according to this embodiment is overlaid on the diffusion light source.

In this embodiment, to solve this problem, a voltage is applied across the portion between the transparent conductive films 153 and 154 of the optical control plate 143 overlaid on the backlight 142 so that an optical emission in generally horizontal directions is substantially eliminated as shown in FIG. 14A. That is, the optical control plate 143 and the backlight 142 are operated as a parallel light source.

As a result, in the image display/input apparatus comprising the backlight 142, the optical control plate 143, and the image display/input panel 141 laminated sequentially in this order, an optical emission in the generally horizontal direction does not occur, and light beams are emitted only perpendicularly from a turned-on pixel, as shown in FIG. 15. That is, light is not emitted from a turned-off pixel of the image display/input panel 141, but is emitted from the turned-on pixel substantially perpendicularly and reaches a dot of the original document 145 opposed to the turned-on pixel.

When the image display/input panel 141 is manufactured by using process technique similar to that used in manufacturing the conventional image display/input panel, the panel exhibits an optical transmission-direction characteristic, as shown in FIG. 16, that light beams are outstandingly transmitted in approximately horizontal directions. But as described above, by allowing substantially parallel light beams, as shown in FIG. 14A, emitted from the parallel light source formed of the backlight 142 and the optical control plate 143 to be incident on the image display/input panel 141, only the turned-on pixel emits parallel light beams in directions substantially perpendicular as described above.

In an image display operation, the control circuit 144 controls the image display/input panel 141 and the optical control plate 143 so as to display an image corresponding to image data on the image display/input panel 141. In an image input operation, the control circuit 144 controls the image display/input panel 141 and the optical control plate 143 so as to sequentially turn on and off the respective pixels of the image display/input panel 141, thus scanning the original document, and processes the electric current corresponding to the density of the original document 145 detected by the light receiving element incorporated in the pixel which has been turned on, thus taking out image data.

As described above, in this embodiment, the optical control plate 143 is interposed between the image display/input panel 141 and the backlight 142. Parallel light beams are emitted in vertical directions without providing the diffusion plate on the backlight 142. The optical control plate 143 is constituted by providing the transparent conductive films 153 and 154 and filling the liquid crystal 156 therebetween. In the image input operation, a voltage is applied between the transparent conductive films 153 and 154 to allow parallel light beams emitted from the backlight 142 in the vertical direction to pass through the optical control plate 143 as they are and to be incident on the image display/input panel 141.

Accordingly, in the image input operation, only one dot, i.e., one small-area portion, of the original document located at a position perpendicular to the turned-on pixel is irradiated and thus, the density of the dot of the original document can be detected according to the intensity of light beams reflected at the dot.

Further, because emission of light beams from the turned-off pixel of the image display/input panel 141 in generally horizontal directions is eliminated, the original document can be scanned by only light beams emitted from the turned-on pixel. Thus, an image input can be accomplished by using a liquid crystal panel.

(Third Embodiment)

Figure 17:
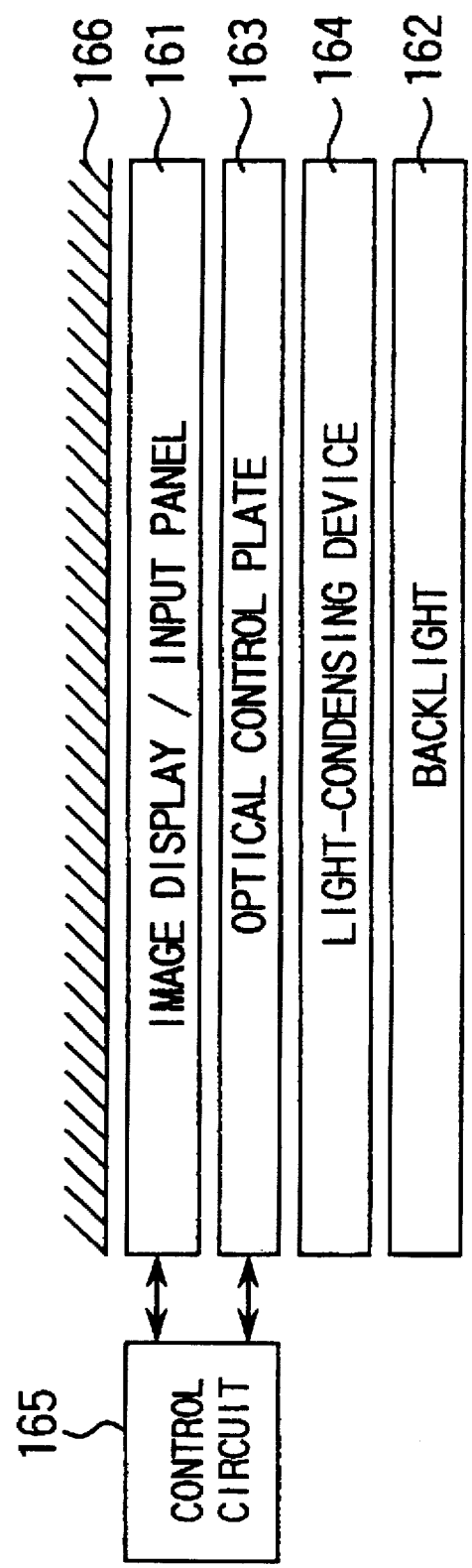
FIG. 17 is a schematic view showing the construction of an image display/input apparatus according to a third embodiment of the present invention.

FIG. 17 schematically shows the construction of an image display/input apparatus according to the third embodiment.

In FIG. 17, reference numeral 161 denotes an image display/input panel, 162 denotes a backlight, 163 denotes an optical control plate, and 164 denotes a light-condensing means which is an important constituent element in this embodiment, 165 denotes a control circuit, and 166 denotes an original document. The image display/input panel 161 according to this embodiment is identical to the image display/input panel 141, shown in FIG. 9, according to the second embodiment and has an image display function and an image input function, with a light receiving element incorporated in the pixel thereof. Further, the backlight 162 and the optical control plate 163 in this embodiment are identical to the backlight 142 and the optical control plate 143 shown in FIG. 9 in the second embodiment, respectively.

In this embodiment, the light-condensing means 164 having a light-condensing function is interposed between the optical control plate 163 and a protection plate (see FIG. 10) of the backlight 162. As the light-condensing means 164, a microlens array can be used.

When a microlens array is used, the pitch of the microlenses is preferably equal to the pixel pitch in the image display/input panel 161 in order to prevent undesired Moire fringe from being generated due to the relationship between the pixel pitch of the image display/input panel 161 and the pitch of the microlenses.

Figure 18A:
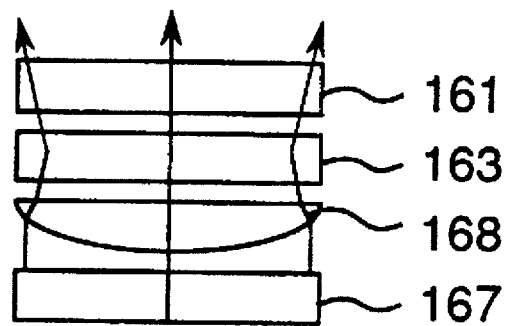
FIGS. 18A and 18B are schematic sectional views showing an image display/input panel, an optical control plate, a microlens array, and a protection plate for one pixel, wherein the microlens array is used as a light-condensing means.
Figure 18B:
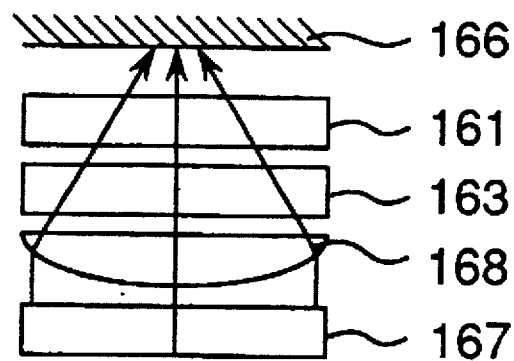

FIGS. 18A and 18B are sectional views of the image display/input panel 161, optical control plate 163, microlens 168, and protection plate 167 of the backlight 162, all for a single pixel, wherein the microlens array is used as the light-condensing means 164. FIG. 18A shows a state in displaying an image. FIG. 18B shows a state in inputting the image.

Light beams emitted from the backlight 162 pass through the protection plate 167 and are then condensed by the microlens 168 in the microlens array, and then enter the image display/input panel 161 via the optical control plate 163, so that the light beams are used in displaying and inputting an image.

First, the operation to be performed in the image display operation is described below with reference to FIG. 18A.

Under the control of the control circuit 165, a voltage is not applied to the optical control plate 163, so that the optical control plate 163 exhibits a light scattering property. The microlens 168 condenses light beams which have been incident thereon via the protection plate 167. But, because the optical control plate 163 exhibits a light scattering property then, light beams incident on the image display/input panel 161 are scattered light. Thus, as in the first and second embodiments, all pixels of the image display/input panel 161 are irradiated simultaneously and uniformly by the light beams. In this manner, an image is displayed.

Next, an operation to be performed in the image input operation is described below with reference to FIG. 18B.

Under the control of the control circuit 165, a voltage is applied to the optical control plate 163, which consequently exhibits an optical transmission property. Thus, light beams, which have been incident on the microlens 168 via the protection plate 167 and thereby condensed, pass through the optical control plate 163 now having the optical transmission property, and then enter the image display/input panel 161.

Because light beams incident on the image display/input panel 161 are condensed by the microlens 168, they form an approximately conic configuration, as shown in FIG. 18B. That is, light beams are not emitted in substantially horizontal directions as in the case that a light source which emits scattered light beams is used. Accordingly, although the image display/input panel 161 has an outstanding optical transmission-direction characteristic in a generally horizontal direction, as shown in FIG. 16, light beams are not emitted in the substantially horizontal directions from a turned-off pixel of the image display/input panel 161, but light beams condensed in the conic configuration are emitted in substantially vertical directions from a turned-on pixel and reach a dot of the original document 166 opposed to the turned-on pixel.

As in the first and second embodiments, under the control of the control circuit 165, the original document 166 is scanned by sequentially turning on and off the pixels of the image display/input panel 161 so as to obtain electrical information corresponding to the density of the original document 166 detected by the light receiving element incorporated in the turned-on pixel on the basis of light beams reflected by the original document 166.

Because light beams condensed by the microlens 168 form a cone, a center light beam thereof is incident on the original document 166 substantially vertically thereto. A light beam forming a general line of the conic configuration is incident on the original document 166, with an angle formed between the general line and a perpendicular of the original document 166. If the angle is too great, light beams emitted from the turned-on pixel of the image display/input panel 161 and reflected from the original document 166 will be received by a light receiving element incorporated in another pixel, as in the case in which a light source which emits scattered light beams is used. As a result, a problem that resolution is deteriorated may occur.

Actually, however, because the height of the cone is sufficiently long relative to the diameter of the bottom surface of the cone, as described below, the vertical angle of the cone is so small as to be ignored and hence, the problem of resolution deterioration does not occur.

As described above, the pitch of the microlenses in the array according to this embodiment is equal to the pixel pitch of the image display/input panel 161. Because the pixel pitch of a conventional liquid crystal panel is approximately 200 microns, the pixel pitch of the image display/input panel 161 according to this embodiment is assumed to be also approximately 200 microns as well. Accordingly, the radius of the microlens 168 to be used in this embodiment is about 100 microns. The radius corresponds to the radius of the bottom surface of the cone.

Let it be supposed that light beams condensed by the microlens 168 in a conic configuration are allowed to be focused on the surface of the original document 166 by adjusting the curvature of the microlenses 168 constituting the microlens array.

The thickness of the conventional liquid crystal panel is 2 mm or larger. This depends on the thickness of two glass substrates sandwiching a liquid crystal layer therebetween. That is, the thickness of one glass substrate to be used in the liquid crystal panel is approximately 1 mm. Thus, if the image display/input panel 161 according to this embodiment is manufactured by the art for manufacturing the conventional liquid crystal panel, the thickness of the image display/input panel 161 will be approximately 2 mm. A value obtained by adding the thickness of the optical control plate 163 to the thickness 2 mm of the image display/input panel 161 corresponds to the height of the cone.

In this embodiment, the curvature of the microlens 168 is examined or calculated, supposing that light beams are condensed at a point 2 mm apart from the microlens 168 when the radius of the microlens 168 is approximately 100 microns. In this case, the vertical angle of the cone found by arctan (100 microns/2 mm) is approximately 3° and this value is practically so small as to be ignored. Accordingly, the problem that resolution is deteriorated does not occur.

Because light beams contribute to the input of the image thereof, the original document 166 should irradiated by light beams of an intensity as high as possible, in consideration of a signal-to-noise ratio. Light beams can be utilized most effectively by designing the microlens array such that light beams are gathered on the surface of the original document 166.

In this case, light beams which are incident on the microlens array are generally parallel with each other but radial to a small degree, as shown in FIG. 11. It is possible to focus most light beams leaving the microlens 168 on the surface of the original document 166 by setting the focal length of the microlens 168 to a value substantially equal to or a little larger than the sum of the thickness of the optical control plate 163, the thickness of the image display/input panel 161, the spacing between the microlens 168 and the optical control plate 163, and the spacing between the optical control plate 163 and the image display/input panel 161.

When a further element such as a protection plate is interposed between the image display/input panel 161 and the original document 166, the focal length of the microlens 168 is designed taking into consideration the thickness of the element and the spacing between it and the image display/ input panel 161, etc. That is, the microlens array should be so designed that the focal point of the microlens 168 is located on the surface of the original document 166.

As described above, because in this embodiment, the light-condensing means 164 composed of the microlens array is provided between the backlight 162 and the optical control plate 163 functioning similarly to those in the second embodiment, light beams emitted from the backlight 162 can be focused at one point on the surface of the original document 166 in the image input operation. Thus, a resolution higher than that of the second embodiment can be obtained.

In addition, because the pitch of the microlenses 168 composing the microlens array is equal to the pixel pitch of the image display/input panel 161, the generation of undesired Moire fringe can be prevented.

Further, light beams emitted from the backlight 162 can be gathered on the surface of the original document 166 more accurately by setting the focal length of the microlens 168 to a value substantial equal to or a litter larger than the sum of the thickness of the optical control plate 163, the thickness of the image display/input panel 161, the spacing between the microlens 168 and the optical control plate 163, and the spacing between the optical control plate 163 and the image display/input panel 161. This contributes to the improvement of the signal-to-noise ratio and is effective in improving sensitivity in an image input.

Needless to say, the image display/input panels 121, 141, and 161 according to each of the first, second, and third embodiments are used along with a polarizing plate disposed above and below them as in the case of the conventional liquid crystal display modules.

(Fourth Embodiment)

Figure 19:
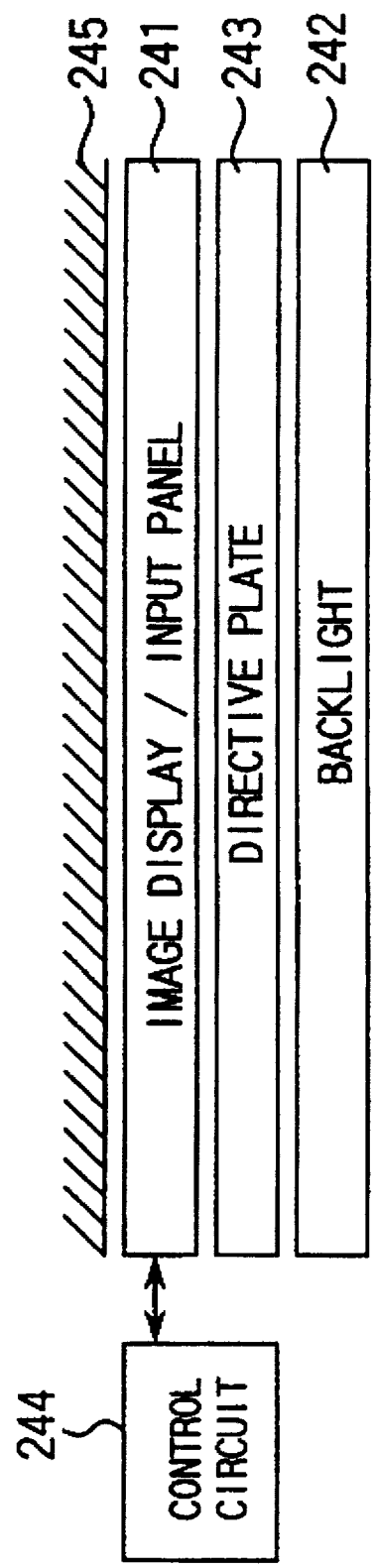
FIG. 19 is a schematic view showing the construction of an image display/input apparatus according to a fourth embodiment of the present invention.

FIG. 19 schematically shows the construction of an image display/input apparatus according to the fourth embodiment.

Figure 37:
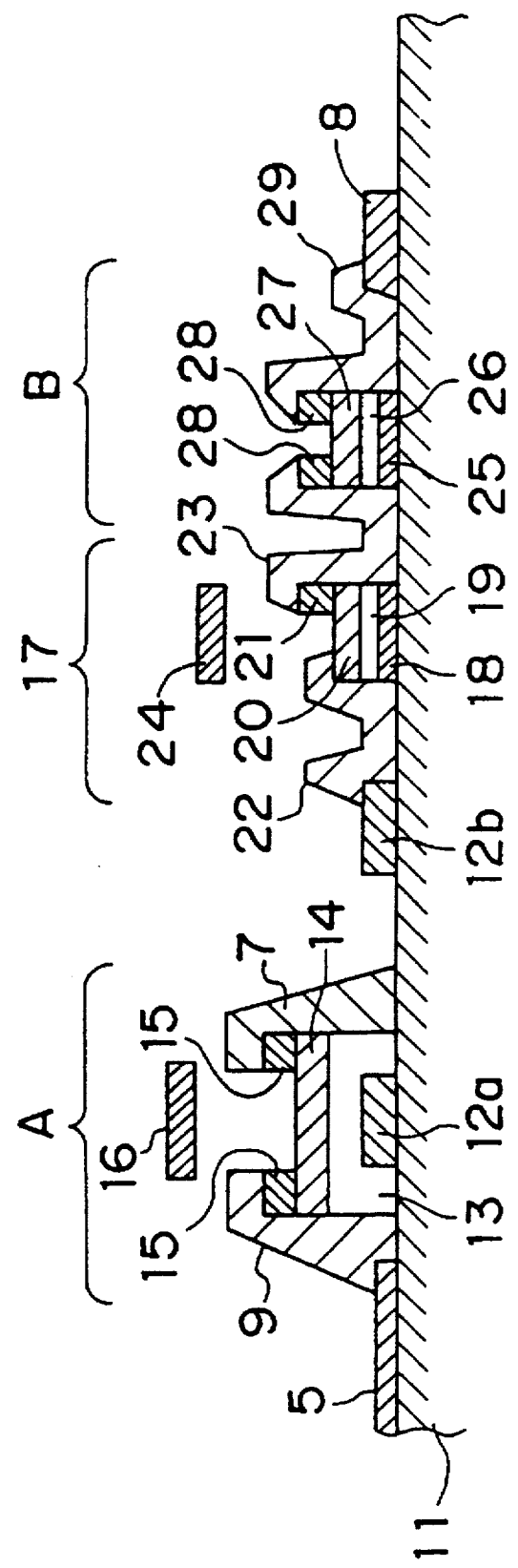
FIG. 37 is a sectional view showing the vicinity of a substrate of the liquid crystal panel shown in FIG. 36.
Figure 39:
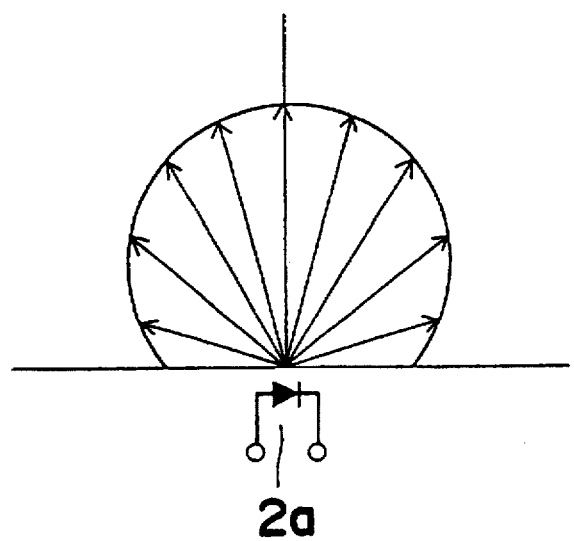
FIG. 39 is a diagram showing the optical emission direction characteristic of a light emitting element shown in FIG. 34.

In FIG. 19, reference numeral 241 denotes an image display/input panel in which one pixel is formed of a liquid crystal display element and a light receiving element, as in the conventional case shown in FIGS. 36 and 37, thus the panel has both an image display function and an image input function. Reference numeral 242 denotes a backlight which functions as a light emitting element together with respective pixels of the image display/input panel 241. Reference numeral 243 denotes a directive plate which is an important constituent element of the apparatus according to the embodiment. Reference numeral 244 denotes a control circuit for controlling the image display/input panel 241 to execute an image display operation and an image input operation.

In operating the image display/input apparatus having the above construction as an image input apparatus, an original document 245, the image of which is to be inputted is placed on the image display/input panel 241 with an ink-printed surface thereof opposed to the image display/input panel 241.

Figure 20:
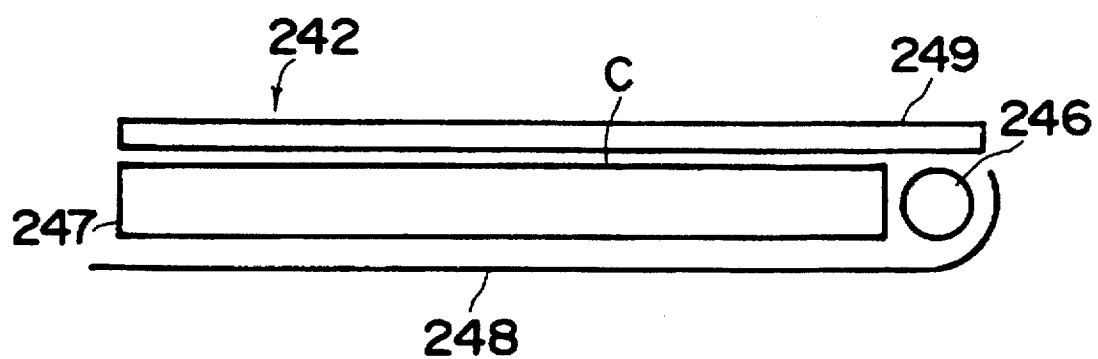
FIG. 20 is a sectional view of a backlight shown in FIG. 19.

As shown in FIG. 20, the backlight 242 essentially consists of a fluorescent lamp 246, a light-leading plate 247, a reflection plate 248, and a diffusion plate 249. Light beams emitted from the fluorescent lamp 246 are reflected toward the light-leading plate 247 by the reflection plate 248, then propagated within the light-leading plate 247 and emitted toward the diffusion plate 249 from an emission surface C of the light-leading plate 247. Thus, the light beams emitted from the emission surface C are diffused by the diffusion plate 249 to the space. At this time, because the light beams emitted by the fluorescent lamp 246 have been diffused, the emission direction characteristic of the light beams is as shown in FIG. 21.

Figure 21:
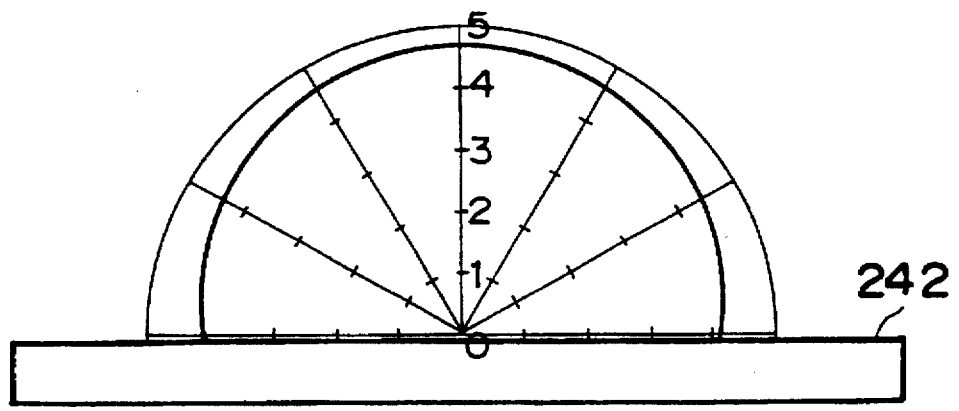
FIG. 21 is a diagram showing the emission direction characteristic of the backlight shown in FIG. 20.

FIG. 21 shows the optical emission direction characteristic in a slight area of the backlight 242 having the above construction. The backlight 242 according to this embodiment provides a uniform emission characteristic which is directed substantially hemispherically from the diffusion plate 249. Because the emission surface of the backlight 242 is an aggregation of slight areas having such an optical emission direction characteristic, the entire emission surface emits substantially diffused or scattered light beams.

Figure 30:
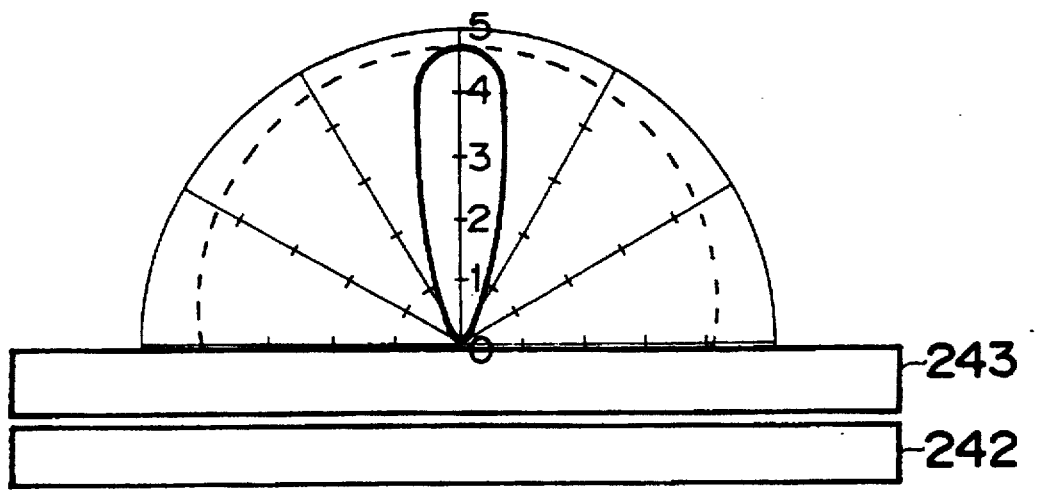
FIG. 30 is a diagram showing an optical emission direction characteristic displayed by the backlight and the directive plate, shown in FIG. 19, laminated on each other.
Figure 31:
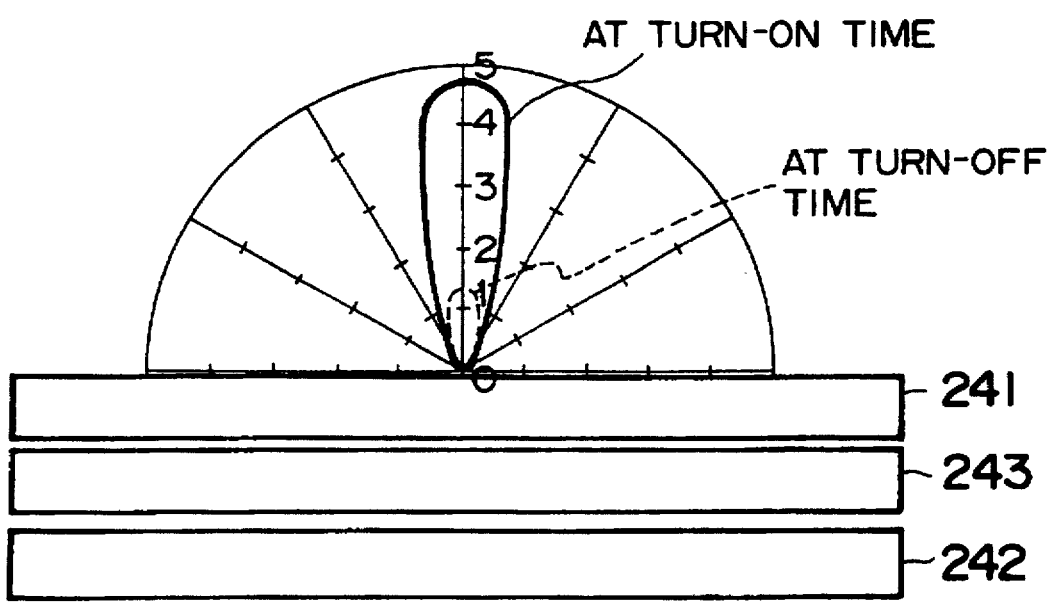
FIG. 31 is a diagram showing an optical emission direction characteristic displayed by the backlight, the directive plate, and an image display/input panel, all shown in FIG. 19, laminated on each other.
Figure 32:
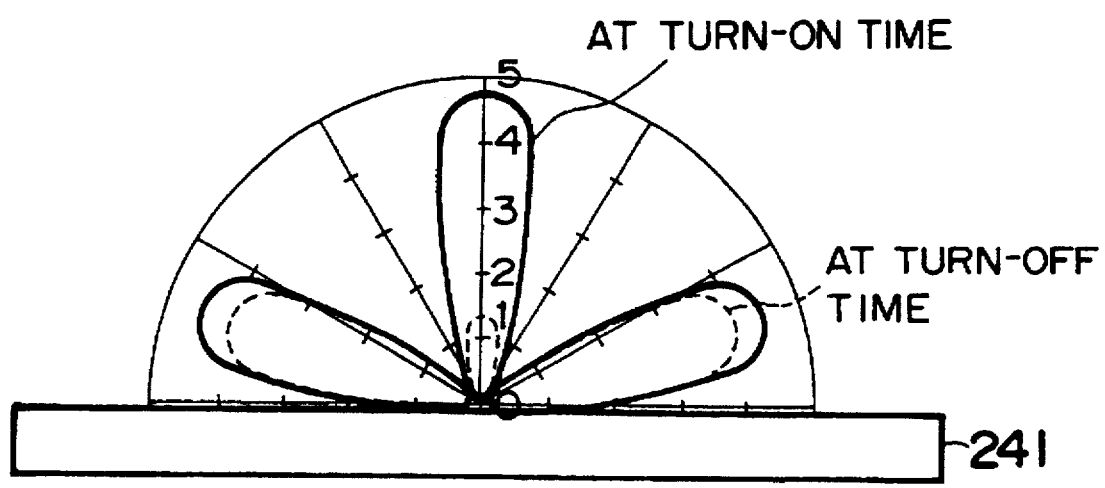
FIG. 32 is a diagram showing an optical transmission-direction characteristic of the image display/input panel shown in FIG. 19.
Figure 33:
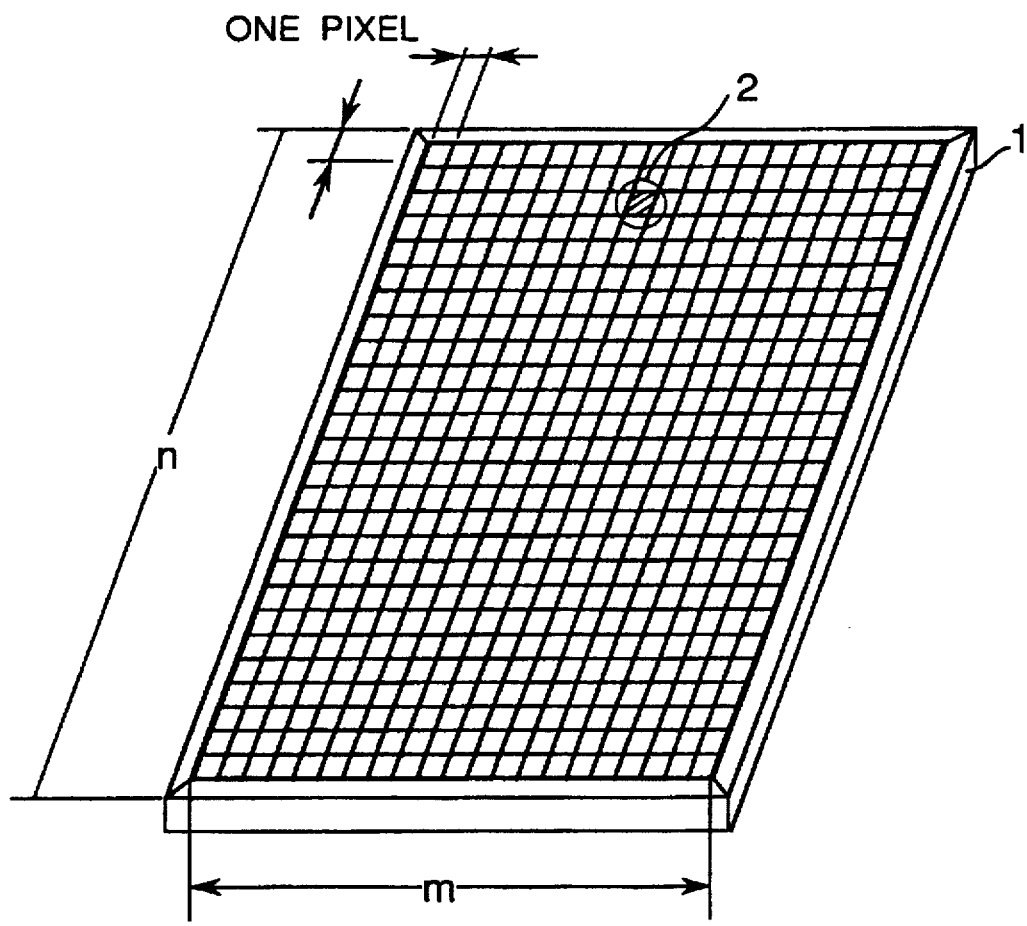
FIG. 33 is a perspective view showing a conventional image display/input panel.
Figure 34:
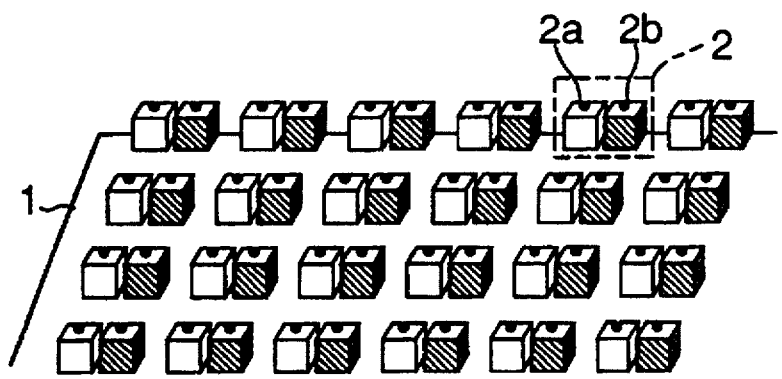
FIG. 34 is a partial enlarged view showing the detailed construction of the image display/input panel shown in FIG. 33.
Figure 35A:
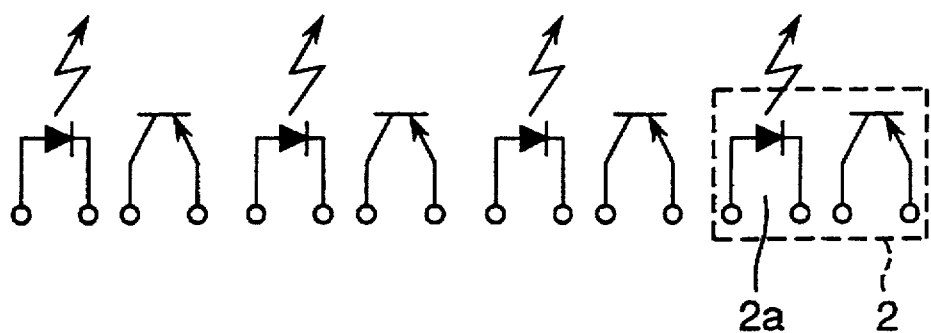
FIGS. 35A and 35B are explanatory views showing operations of the image display/input panel shown in FIG. 33.
Figure 35B:
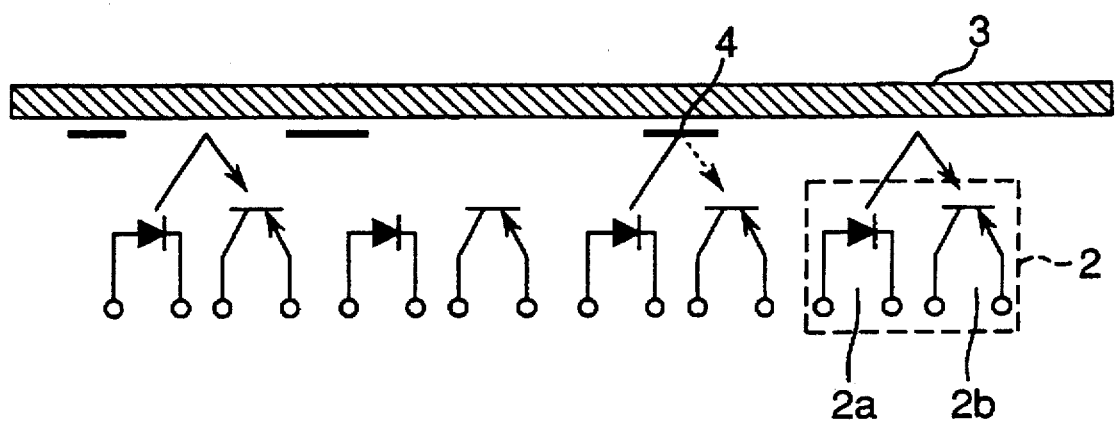

The optical emission direction characteristic diagrams shown in FIGS. 30 and 31 and the optical transmission-direction characteristic diagram shown in FIG. 32 indicate the characteristic of a slight area of each object. Thus, the aggregation of the direction characteristics of slight areas displays the direction characteristic of the entire object.

Figure 22:
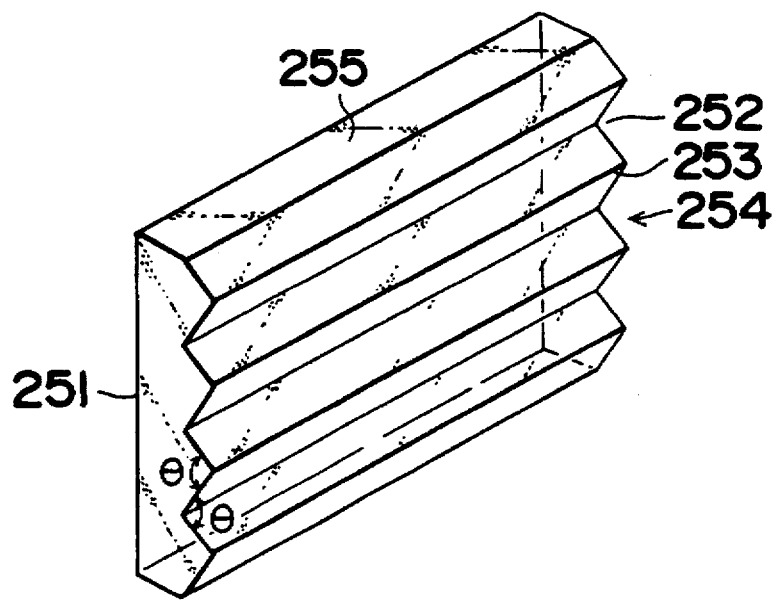
FIG. 22 is a perspective view showing a prism sheet to constitute a directive plate shown in FIG. 19.
Figure 23:
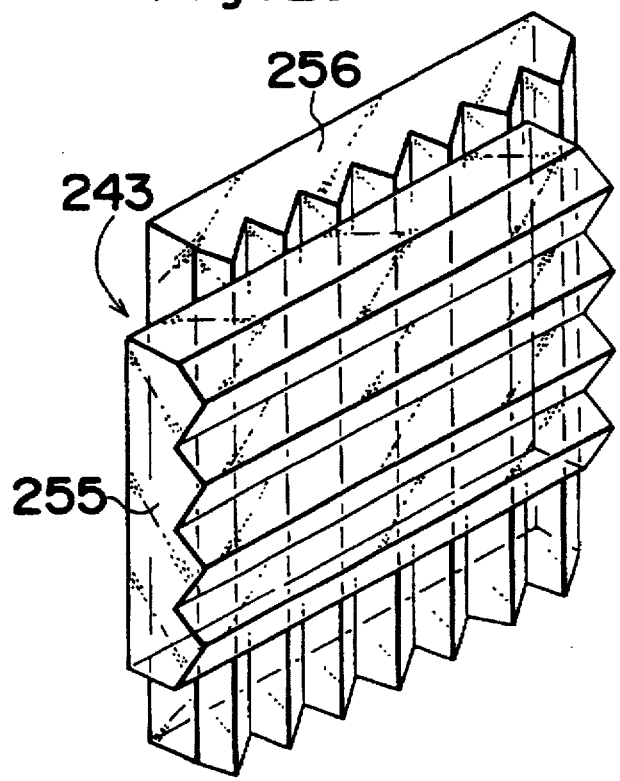
FIG. 23 is a perspective view showing a directive plate constituted of the prism sheets shown in FIG. 22.

As shown in FIG. 23, the directive plate 243 is composed of two prism sheets 255 and 256 laminated on each other. As shown in FIG. 22, in each of the prism sheets 255 and 256 (represented by prism sheet 255), one of the surfaces thereof is a smooth plane 251 and the opposite surface thereof is an uneven surface 254 consisting of concaves 252 and convexes 253, which looks like a construction in which a plurality of bar-shaped prisms are arranged in parallel with each other. Both prism sheets 255 and 256 are laminated on each other in such a manner that the extension direction of the concave 252 and the convex 253 of the prism 255 is perpendicular to that of the concave 252 and the convex 253 of the prism 256.

FIGS. 24 through 28 are diagrams for describing the operation of the directive plate 243. First, the operation of the prism sheet 255 is described below with reference to FIGS. 24 and 25.

Figure 24:
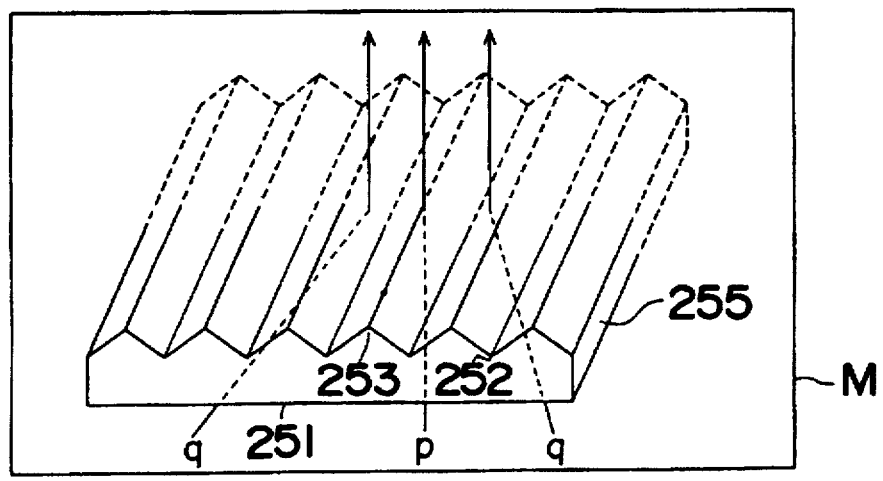
FIG. 24 is an explanatory view showing an operation of the prism sheet shown in FIG. 22.
Figure 25:
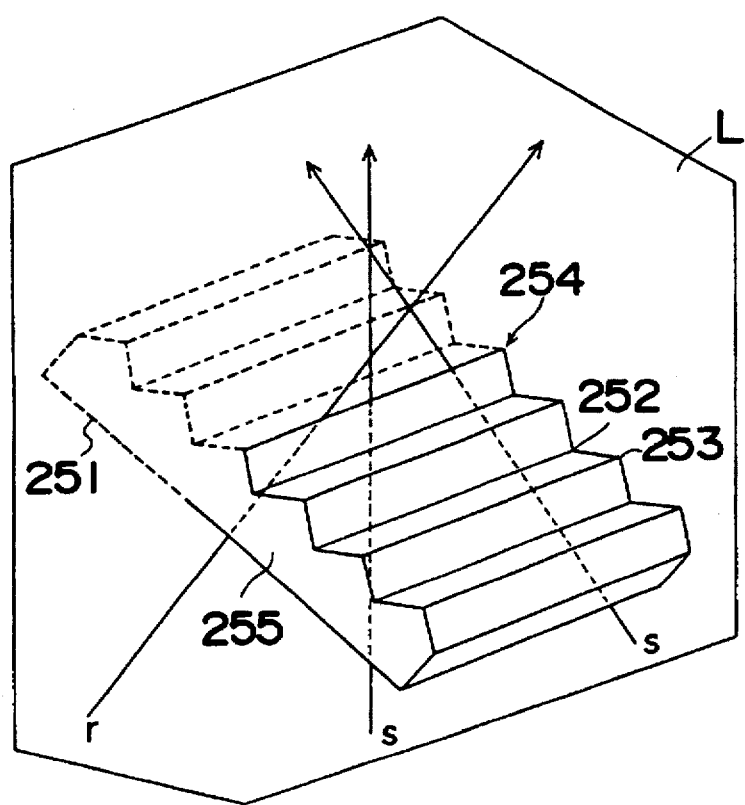
FIG. 25 is an explanatory view showing another operation of the prism sheet shown in FIG. 22.

As shown in FIG. 24, a light beam p which has been incident on the prism sheet 255 at a right angle therewith from the side of the plane 251 along a plane M perpendicular to the extension direction of the concaves 252 and the convexes 253 arranged in parallel with each other and a light beam q which has been obliquely incident on the prism sheet 255 along the plane M are refracted at the concaves 252 or the convexes 253 of the prism-shaped surface 254 (see FIG. 22) opposite to the plane 251, thus leaving the prism sheet 255 at substantially right angles with the plane 251. Further, as shown in FIG. 25, a light beam r which has been incident on the prism sheet 255 at a right angle with the plane 251 from the side of the plane 251 along a plane L parallel with the extension direction of the concave 252 and the convex 253 and a light beam s which has been incident on the prism sheet 255 obliquely to the plane 251 along the plane L leave the prism sheet 255 in the directions in which those light beams have been incident, respectively, without being influenced by the concaves 252 and the convexes 253 both positioned on the side opposite to the plane 251.

Figure 26:
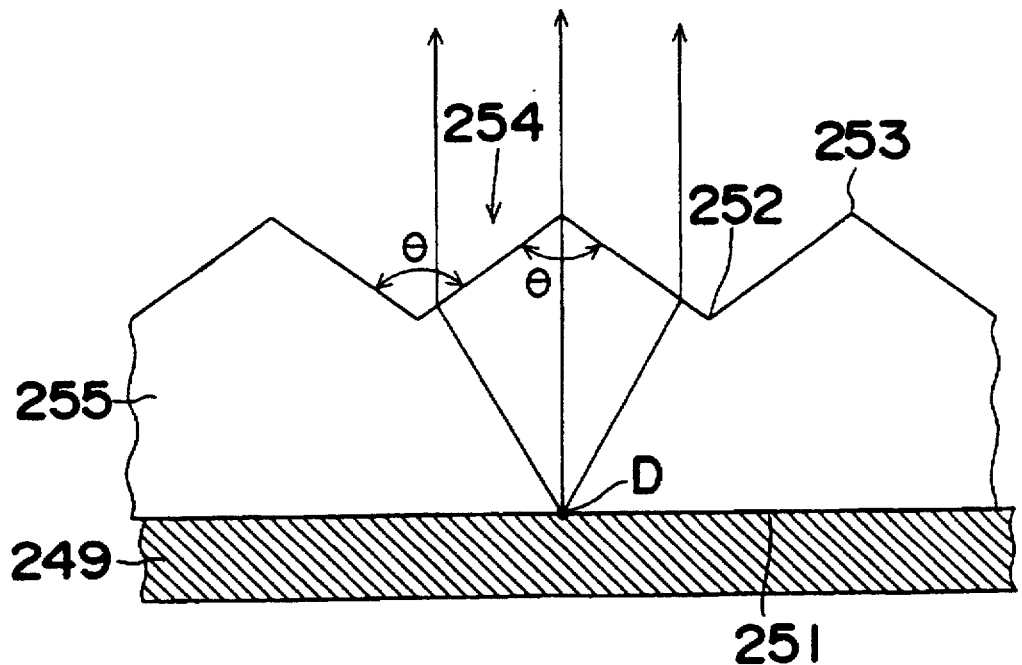
FIG. 26 is a sectional view of the prism sheet shown in FIG. 24.
Figure 27:
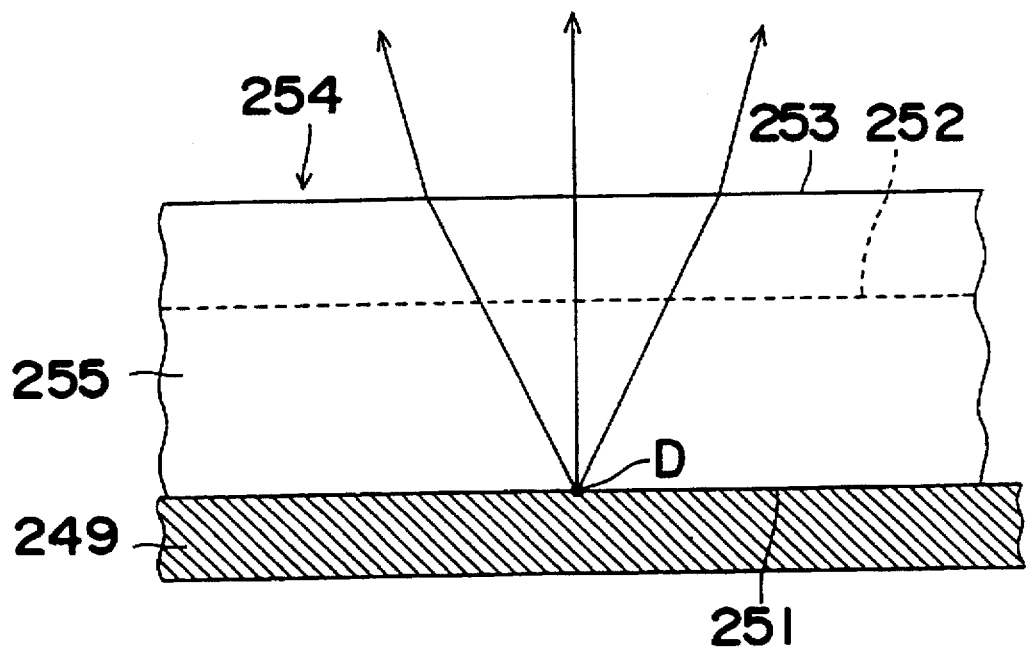
FIG. 27 is a sectional view showing the prism sheet shown in FIG. 25.

This is further described in detail with reference to FIGS. 26 and 27. As described above, the prism sheets 255 and 256 are used in a overlaid manner on the diffusion plate 249 of the backlight 242. FIGS. 26 and 27 show paths of light beams emitted radially from a point D having a very small area on the diffusion plate 249 in accordance with the optical emission direction characteristic shown in FIG. 21, supposing that the plane 251 of the prism sheet 255 is in close contact with the diffusion plate 249.

FIG. 26 is a sectional view of the prism sheet 255, shown in FIG. 24, on which light beams are incident from the side of the plane 251 along the plane M. In this case, the light beams emitted from the slight-area dot D on the diffusion plate 249 are incident on the prism sheet 255 from the side of the plane 251 and refracted at the concave 252 or the convex 253 and then go out from the concave 252 or the convex 253, with the light beams being substantially perpendicular to the plane 251 and substantially parallel with each other.

Figure 29:
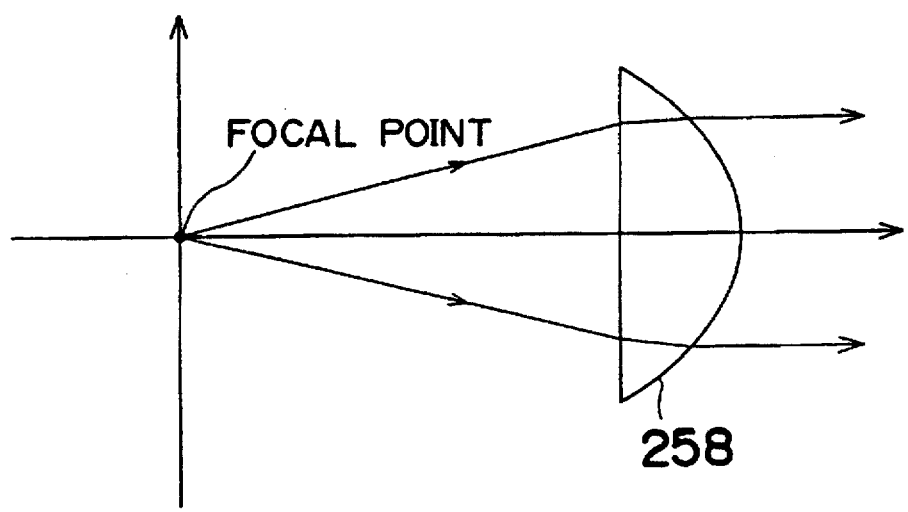
FIG. 29 is an explanatory view showing an operation of a plano-convex lens.

Such an operation corresponds substantially to an operation to be made when an emission source is set at a focal point of a plano-convex lens 258 shown in FIG. 29. Thus, which of the light beams incident on the prism sheet 255 leaves it at substantially a right angle with the plane 251 depends on an angle θ of the concave 252 of the prism sheet 255 and that of the convex 253 thereof. The detailed description of the method of calculating the angle θ is omitted herein. As will be described later, in order to output a light beam from the prism sheet 255 at an angle of within ±10° with respect to a perpendicular to the plane 251, θ is set to approximately 115°, supposing that the pitch of the concaves and that of the convexes of the prism sheet 255 are approximately 300 microns, respectively, that the thickness of the prism sheet 255 is approximately 1 mm, and that the material of the prism sheet 255 is polyvinyl chloride.

Preferably, the angle θ is set to 90°–120°, supposing that as the material of the prism sheet 255, a material such as polycarbonate having a high density and a refractive index higher than that of acrylic resin, glass and air is used, that the thickness of the prism sheet 255 is 150 microns—one millimeter, that the image display/input panel 241 having a pixel pitch of 200 microns—350 microns is used, and that light beams leave the prism sheet 255 at within ±5°–±15° with respect to the perpendicular to the plane 251.

FIG. 27 is a sectional view of the prism sheet 255 on which light beam are incident from the side of the plane 251 along the plane L shown in FIG. 25. In this case, light beams which have been emitted from a dot D on the diffusion plate 249 and incident on the prism sheet 255 from the side of the plane 251 are substantially parallel with the extension direction of the concave 252 and the convex 253. Thus, the light beams leave the prism sheet 255 from the uneven surface 254 thereof at an angle equal to an angle at which the light beams have entered the prism sheet 255. Such an operation is similar to an operation to be performed by a glass plate, i.e., the light beam is passed through after it is refracted twice.

Figure 28:
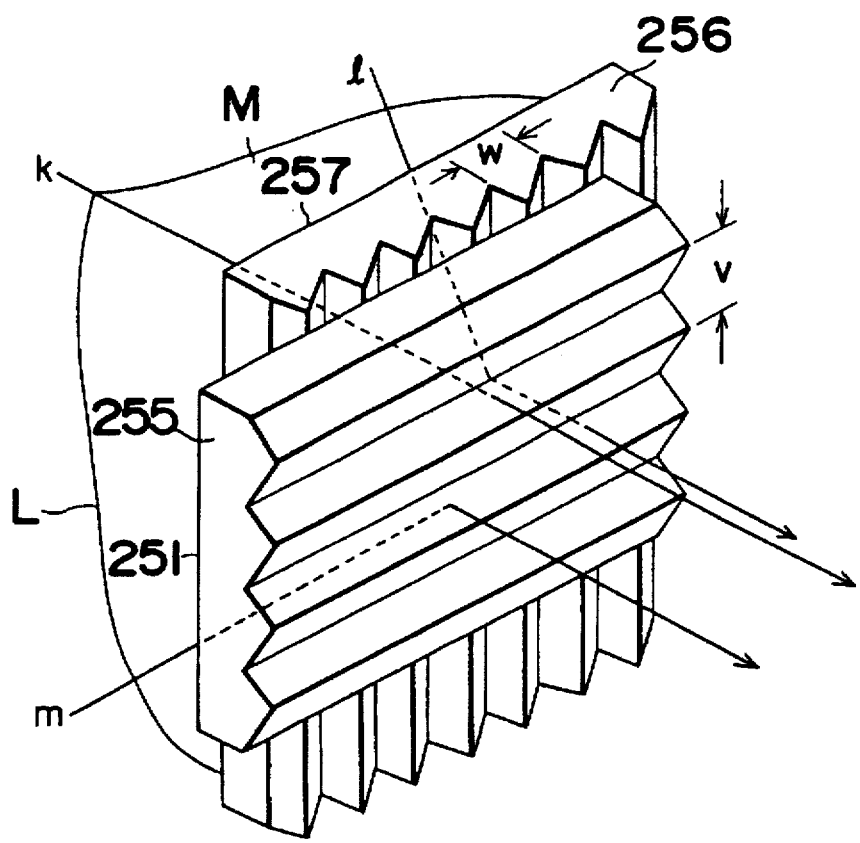
FIG. 28 is an explanatory view showing an operation of the directive plate shown in FIG. 23.

Description has been made on the case in which light beams are incident on the prism sheet 255 along the plane M perpendicular to the extension direction of the concave 252 of the prism sheet 255 and the convex 253 thereof and the case in which light beams are incident on the prism sheet 255 along the plane L parallel with the extension direction of the concave 252 and the convex 253. In this embodiment, as shown in FIG. 28, two prism sheets 255 and 256 are used by laminating them on each other in such a manner that the extension direction of the concave 252 and the convex 253 of the prism sheet 255 is perpendicular to the extension direction of those of the prism sheet 256.

In this case, a light beam k which has been incident on the prism sheet 256 located on the side of the diffusion plate 249 from the side of the plane 257 leaves the prism sheet 256, with the light beam k substantially perpendicular to the plane 257 of the prism sheet 256, thus reaching the plane 251 of the prism sheet 255, similarly to the light beam p in FIG. 24. The light beam k goes out from the prism sheet 255, with the light beam k substantially perpendicular to the plane 251 of the prism sheet 255, similarly to the light beam p in FIG. 24. That is, the light beam k which has been incident on the prism sheet 256 from the side of the plane 257 passes through the prism sheets 255 and 256, thus leaving them.

A light beam l which has been incident on the prism sheet 256 obliquely along the plane M perpendicular to the extension direction of the concave 252 and the convex 253 of the prism sheet 256 leaves the prism sheet 256, with the light beam l substantially perpendicular to the plane 257 of the prism sheet 256, thus reaching the plane 251 of the prism sheet 255, similarly to the light beam q in FIG. 24. Then, the light beam l leaves the prism sheet 255, with the light beam l substantially perpendicular to the plane 251 of the prism sheet 255, similarly to the light beam p in FIG. 24. That is, the light beam l which has been incident on the prism sheet 256 obliquely from the side of the plane 257 along the plane M leaves the prism sheet 255 substantially parallel with the light beam k.

A light beam m which has been incident on the prism sheet 256 obliquely along the plane M parallel with the extension direction of the concave 252 and the convex 253 leaves the prism sheet 256 at an angle equal to the incident angle, thus reaching the plane 251 of the prism sheet 255, similarly to the light beam s shown in FIG. 25. Then, the light beam m leaves the prism sheet 256, with the light beam m substantially perpendicular to the plane 251 of the prism sheet 255, similarly to the light beam q shown in FIG. 24. That is, the light beam m which has been incident on the prism sheet 256 from the side of the plane 257 of the prism sheet 256 along the plane L leaves the prism sheet 255 substantially parallel with the light beam k.

After all, as shown in FIG. 28, the directive plate 243 constituted of the prism sheets 255 and 256 laminated on each other in such a manner that the extension direction of the concave 252 and the convex 253 of the prism sheet 255 is perpendicular to the extension direction of those of the prism sheet 256 operates as a filter which allows light beams substantially perpendicular to the plane 257 to leave it, irrespective of the incident directions of light beams.

Considering the function of such a filter, as apparent from FIGS. 26 and 29, when the plano-convex lens 258 as shown in FIG. 29 is used, light beams emitted radially from a light source are refracted and travel in parallel with each other by placing the light source at a focal point. Thus, the directive plate 243 prevents light beams from being scattered in undesired oblique directions.

The sectional configuration of the prism sheets 255 and 256 shown in FIG. 26 is not in the shape of a circular arc or a hyperbola but linear and approximated to a lens. The purpose of using the prism sheets 255 and 256 is to obtain an operation similar to that performed by the plano-convex lens 258. Accordingly, the prism sheets 255 and 256 are not as effective as the plano-convex lens 258 in preventing light beams from being scattered in undesired oblique direction by converting light beams emitted radially from a dot having a slight area into parallel beams perpendicular to a plane on which they have been incident.

The reason the prism sheets 255 and 256 are used in this embodiment in spite of the above-described insufficiency is for the following reason:

The first point is as follows: In a microlens array comprising the plano-convex lenses arranged in a two-dimensional array configuration is commercially available, a very high curvature accuracy is required to form a curved surface. Thus, the microlens array is very expensive. Accordingly, a large (diagonally 10-inch) microlens array to be applied to the image display/input panel 241 is very expensive. Thus, it is difficult to compose a directive plate of such an expensive microlens array, whereas the prism sheets are linear in section and thus can be configured with ease and high accuracy and hence inexpensive.

The second point is as follows: As a result of examinations on the degree of accuracy in converting light beams emitted radially from the focal point into light beams perpendicular to the plane on which they have been incident, it has been found that a level approximate to the perpendicular direction is sufficient. This point is described below.

In FIG. 19, the image display/input panel 241 has an outlook similar to that of a conventional liquid crystal panel. Thus, the thickness of the image display/input panel 241 is about 2 mm. A light beam which has been emitted from the directive plate 243 passes through the image display/input panel 241 of about 2 mm, thus irradiating the original document 245. Supposing that the light beam emitted from the directive plate 243 is not changed completely in its progress direction and dislocated slightly from a direction perpendicular to a plane on which the light beam has been incident, the original document 245 positioned 2 mm apart from the light beam is irradiated by the light beam dislocated from the direction perpendicular to the plane on which the light beam has been incident.

The following discusses the influence given when the original document 245 which is 2 mm apart from the light beam is irradiated by light beams emitted from the backlight 242 and dislocated from the direction perpendicular to the plane on which the light beams have been incident. Supposing that a light beam which has been incident on the directive plate 243 having a thickness of 2 mm leaves the directive plate 243 at 3° from the perpendicular direction, the light beam becomes dislocated by the following distance while the light beam is passing through the directive plate 243:

$$2 \text{ mm} \times \tan(3°) = 100 \text{ microns}$$

This means that supposing that the pitch of the pixels of the image display/input panel 241 is approximately 300 microns, portions of the original document 245 corresponding to respective pixels adjacent to each other are irradiated simultaneously in the positions dislocated by approximately ⅓ pixel pitch.

As described above, about ⅓ of a portion of the original document 245 corresponding to the adjacent pixel is also irradiated when the original document 245 is irradiated by the light beam inclined by 3° from the perpendicular direction. The intensity of the light beam falling within a solid angle of 3° is $(⅓)^3 = 1/27$. Because this value is much smaller than the illumination intensity at a position to be irradiated, the value can be ignored.

Because the directive plate 243 and the image display/input panel 241 are laminated on each other, the directive plate 243 may cause Moire fringe with the image display/input panel 241, depending on the relationship between the pixel pitch z of the image display/input panel 241 and the pitch v of the convexes of the prism sheets 255 and 256 constituting the directive plate 243 as well as the pitch w of the concaves thereof. Therefore, the pitches v and w are required to be equal to the pixel pitch z of the image display/input panel 241 or to be neglectably small. That is, x, y=z or x, y<<z.

Generally, because the pixel pitch z of the image display/input panel 241 is approximately 200 microns—300 microns, preferably, the pitches v and w are tens of microns or 200 microns to 300 microns, i.e., equal to the pixel pitch z.

In this embodiment, the directive plate 243 having the above construction is used by overlaying it on the backlight 242 displaying the emission direction characteristic shown in FIG. 21. The optical emission direction characteristic to be displayed when the directive plate 243 is overlaid on the backlight 242 is as shown in FIG. 30. Dotted lines indicate the emission direction characteristic of the backlight 242. By obtaining such an optical emission direction characteristic, light beams emitted by the backlight 242 in various directions leave the directive plate 243 (θ=115°), with the directive plate 243 converging the light beams into light beams having directives within ±10° with respect to a perpendicular to the plane 251, as shown in FIG. 30. Accordingly, the optical direction characteristic of the light beams which leave the directive plate 243 is that they leave it only in directions substantially perpendicular to the plane 251.

As described above, by using the directive plate 243, light beams which have been incident on the directive plate 243 from the backlight 242 at various angles leave the backlight 243, with the light beams converged into light beams having directives within ±10° with respect to the perpendicular to the plane 257. Accordingly, a luminance measured in a range within ±10° with respect to the perpendicular to the plane on which the light beams have been incident by the use of only the backlight 242 is higher than that measured in a range within ±10° with respect to the perpendicular to the plane on which the light beams have been incident by the use of the directive plate 243 overlaid on the backlight 242.

That is, the directive plate 243 allows the progress direction of the light beam emitted by the backlight 242 to one direction and in addition, allows a luminance in reading an image by irradiating the original document 245 to be increased so as to permit reflected light beams having a high intensity to be incident on a light receiving element.

The backlight 242 and the directive plate 243 are set below the image display/input panel 241.

In displaying an image by means of the image display/input apparatus having the above construction, similarly to the second prior art example, a voltage corresponding to image data is applied to the pixel electrode of each pixel of the image display/input panel 241 and turned on and off to display the image on the image display/input panel 241.

In inputting the image, a voltage is applied to only the pixel electrode of a pixel opposed to a dot or small-area portion, of the original document 245, the image of which is to be inputted to turn it on, while no voltage is applied to the pixel electrodes of other pixels to turn them off. In this manner, a particular dot on the original document 245 is irradiated by light beams emitted by pixels, of the image display/input panel 241, which have been turned on to photoelectrically convert the light beams reflected at the dot by means of light receiving elements (not shown) incorporated in the pixels.

In this case, in the embodiment, as described previously, because the directive plate 243 has a light-condensing operation, a point of the original document 245 whose image is to be inputted can be illuminated brighter. Thus, it is possible to allow reflected light beams having a high intensity to be incident on the light receiving element.

In the conventional art, the backlight having the emission direction characteristic as shown in FIG. 21 is laminated on the image display/input panel having a high optical transmittance, irrespective of ON and OFF of pixels in a nearly horizontal plane; having a high optical transmittance in a vertical direction when the pixels are ON; and a low optical transmission-direction characteristic when the pixels are OFF (refer to FIG. 32). Thus, an optical emission direction characteristic as shown in FIG. 40 is displayed.

Unlike the prior art, in the embodiment, the directive plate 243 is overlaid on the backlight 242, and the image display/input panel 241 is overlaid on the directive plate 243 to construct the image display/input apparatus. By overlaying the directive plate 243 on the backlight 242, the optical emission direction characteristic is improved as shown in FIG. 30, and hence an optical emission in a direction nearly a horizontal plane hardly occurs. Consequently, even though the image display/input panel 241 having the optical transmission-direction characteristic as shown in FIG. 32 is overlaid on the directive plate 243, an optical emission in the direction nearly the horizontal plane does not occur, irrespective of ON and OFF of the pixels of the image display/input panel 241, and light beams are emitted in only vertical directions when the pixels are turned on, as shown in FIG. 31.

Thus, the apparatus enables the input of an image by using the image display/input panel 241 having the same optical transmission-direction characteristic as that of the liquid crystal panel. Further, in an image input operation, the apparatus prevents the incidence of a light beam emitted by a pixel adjacent to the light receiving element incorporated in a turned-on pixel of the image display/input panel 241 and reflected, thus increasing a resolution when the image is inputted.

The control circuit 244 drives the image display/input panel 241 in accordance with image data in displaying an image, thus causing the image display/input panel 241 to display the image thereon in accordance with the image data. In inputting the image, the control circuit 244 sequentially turns on and off the pixels of the image display/input 241 so as to scan the original document 245 and adjusts the intensity of electric current in accordance with the density of the original document 245 detected by the light receiving element incorporated in the pixel which has been turned on, thus taking out image data.

As described above, in the embodiment, the directive plate 243 is interposed between the image display/input panel 241 and the backlight 242. The directive plate 243 is constituted of the prism sheets 255 and 256 each having the flat surface and the irregular surface having the prism-shaped concaves and convexes (θ=90°–120°) formed thereon. The prism sheets 255 and 256 are laminated on each other in such a manner that the extension direction of the concave and the convex of the prism sheet 255 is perpendicular to that of the concave and convex of the prism sheet 256. The directive plate 243 alters the progress direction of light beams which have been incident thereon to within ±10° with respect to the perpendicular to the incident plane 257 of the directive plate 243.

Accordingly, in inputting the image, only one dot of the original document positioned in a direction perpendicular to the pixel which has been turned on is irradiated, so that the density of the dot can be detected according to the intensity of a light beam reflected from the dot.

In addition, the pixel of the image display/input panel 241 which has been turned off does not emit light beams in the direction nearly the horizontal plane, and the original document can be scanned by only an optical emission of the pixel which has been turned on. Thus, an image input can be accomplished by using the liquid crystal panel.

Further, because the directive plate 243 allows light beams emitted from the backlight 242 to leave it at an angle within ±10° with respect to the perpendicular to the incident plane 257, the brightness of light to irradiate the original document is increased in inputting the image, and thus signal-to-noise ratio is increased.

Needless to say, as in the case of the conventional liquid crystal display module, the image display/input panel 241 is used by providing polarizing plates above and below it, although this has not been described above.

In the above description, the directive plate 243 comprises the prism sheets 255 and 256 laminated on each other in such a manner that the extension direction of the concave 252 and the convex 253 of the prism sheet prism sheet 255 is perpendicular to that of the concave 252 and convex 253 of the prism sheet 256. This is to describe the principle of light condensation to be performed by the prism sheets 255 and 256 which is used to prevent the deterioration of the resolution of an inputted image by preventing light beams which irradiates the original document from being diffused in all directions, as described previously.

If an image display/input panel which diffuses light beams to irradiate the original document in a specific direction has been developed, the object can be achieved by preventing the diffusion of the light beams in the specific direction. Therefore, in such a case, the use of one prism sheet for condensing light beams in one direction is sufficient for achieving the object.

For example, if an image display/input panel which diffuses light beams horizontally not in a great extent but only vertically has been developed, only one prism sheet is provided in such a manner that the extension direction of the concave and that of the convex thereof are horizontal. If an image display/input panel which diffuses light beams vertically not in a great extent but only horizontally has been developed, only one prism sheet is provided in such a manner that the extension direction of the concave and that of the convex thereof are vertical. The directive plate 243 can be manufactured at a low cost by doing so.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image display/input apparatus comprising;
    a flat blacklight for emitting light beams from a surface thereof;
    an image display/input panel constituted of a liquid crystal display panel wherein a light receiving element is incorporated in each pixel;
    means for receiving the light beams emitted by the blacklight and outputting light beams substantially perpendicularly to the image display/input panel, said means being disposed between the blacklight and the image display/input panel;
    a control circuit for controlling the image display/input panel such that in displaying an image, each pixel is turned on or off according to image data so as to display an image corresponding to the image data, and that in inputting an image, the pixels are sequentially turned on and off to optically scan an original document which is placed on the image display/input panel with a surface thereof having optical density information being in contact with the image display/input panel; and
    wherein a pixel turned on by the control circuit outputs the light beams substantially perpendicularly to the original document.

2. The image display/input apparatus according to claim 1, wherein said means comprises an emission direction characteristic-forming plate having such an emission transmission-direction characteristic that allows only light beams which are incident on a surface thereof at generally right angles therewith to pass therethrough and forming an emission direction characteristic of the backlight.

3. The image display/input apparatus according to claim 2, wherein the emission direction characteristic-forming plate comprises:

two transmitting flat plates, side surfaces of which are opposed to each other; and a plurality of light-intercepting flat plates mounted on the opposed side surfaces of the transmitting flat plates at right angles therewith and partitioning a gap between the transmitting flat plates into a plurality of spaces.

4. The image display/input apparatus according to claim 3, wherein the emission direction characteristic-forming plate has been processed so as to be nonreflective.

5. The image display/input apparatus according to claim 3, wherein the emission direction characteristic-forming plate is painted black.

6. An image display/input apparatus comprising;

a flat blacklight for emitting light beams from a surface thereof;

an image display/input panel constituted of a liquid crystal display panel wherein a light receiving element is incorporated in each pixel;

means for receiving the light beams emitted by the blacklight and outputting light beams substantially perpendicularly to the image display/input panel, said means being disposed between the blacklight and the image display/input panel;

a control circuit for controlling the image display/input panel such that in displaying an image, each pixel is turned on or off according to image data so as to display an image corresponding to the image data, and that in inputting an image, the pixels are sequentially turned on and off to optically scan an original document which is placed on the image display/input panel with a surface thereof having optical density information being in contact with the image display/input panel;

wherein said means comprises an optical control plate which exhibits an optical transmission property or an optical diffusion property according to a change of an electric signal so as to control a direction characteristic of the light beams, and wherein said control circuit further controls the electric signal to be inputted to the optical control plate such that in displaying an image, the optical control plate has the optical diffusion property and that in inputting an image, the optical control plate has the optical transmission property.

7. The image display/input apparatus according to claim 6, further comprising a light condensing means disposed between the backlight and the optical control plate for condensing the light beams emitted from the backlight.

8. The image display/input apparatus according to claim 7, wherein the light-condensing means comprises a microlens array.

9. The image display/input apparatus according to claim 8, wherein a pitch of microlenses in the microlens array is equal to a pixel pitch of the image display/input panel.

10. The image display/input apparatus according to claim 8, wherein a focal length of each microlens is equal to or longer than a distance between an upper surface of the microlens and an upper surface of the image display/input panel.

11. An image display/input apparatus comprising;

a flat blacklight for emitting light beams from a surface thereof;

an image display/input panel constituted of a liquid crystal display panel wherein a light receiving element is incorporated in each pixel;

means for receiving the light beams emitted by the blacklight and outputting light beams substantially perpendicularly to the image display/input panel, said means being disposed between the blacklight and the image display/input panel;

a control circuit for controlling the image display/input panel such that in displaying an image, each pixel is turned on or off according to image data so as to display an image corresponding to the image data, and that in inputting an image, the pixels are sequentially turned on and off to optically scan an original document which is placed on the image display/input panel with a surface thereof having optical density information being in contact with the image display/input panel;

wherein said means comprises a directive plate which consists of two prism sheets each having a flat surface and an opposed uneven surface having prism-shaped concaves and convexes, wherein the prism sheets are superimposed on each other in such a manner that a direction in which the concaves and the convexes of one prism sheet extend is perpendicular to a direction in which the concaves and the convexes of the other prism sheet extend, and wherein each convex of the prism sheets has a vertical angle θ in a range from 90° to 120°.

* * * * *